United States Patent [19]

Tanabe et al.

[11] Patent Number: 5,333,131
[45] Date of Patent: Jul. 26, 1994

[54] PACKET SWITCHING METHOD AND SYSTEM WITH SELF-ROUTING SWITCH

[75] Inventors: Shiro Tanabe, Saitama; Akinori Kubo, Yokohama, both of Japan; Taihei Suzuki, Norcross, Ga.

[73] Assignees: Hitachi, Ltd., Tokyo; Hitachi Software Engineering Co., Ltd., Yokohama, both of Japan

[21] Appl. No.: 747,144
[22] Filed: Aug. 19, 1991
[30] Foreign Application Priority Data Aug. 17, 1990 [JP] Japan .................................. 2-215712

[51] Int. Cl.$^5$ ............................................ H04L 12/56
[52] U.S. Cl. ........................................ 370/54; 370/60; 370/94.1
[58] Field of Search .................. 370/60, 94.1, 54, 85.6, 370/95.1, 110.1, 94.2, 94.3, 60.1; 340/825.5, 825.51

[56] References Cited

U.S. PATENT DOCUMENTS

| 4,837,761 | 6/1989 | Isono et al. | 370/60 |
| 5,014,266 | 5/1991 | Bales et al. | 370/110.1 |
| 5,084,867 | 1/1992 | Tachibana et al. | 370/54 |
| 5,119,369 | 6/1992 | Tanabe et al. | 370/60 |

FOREIGN PATENT DOCUMENTS 0274793 7/1988 European Pat. Off. .
0439098 7/1991 European Pat. Off. .

OTHER PUBLICATIONS

*IEEE International Conference on Communications—ICC'90*, "A New Transport Network Architecture Based on Asynchronous Transfer Mode Techniques", I. Tokizawa, et al., Apr. 16-19, 1990 Atlanta, Ga.
"Bandwidth allocation for ATM networks", W. Wang et al, IEEE Int. Conf. On Communications '90, Atlanta, Ga, Apr. 15th-19th 1990, vol. 2 pp. 439-442, IEEE, New York, US.
"Broad-band ATM Network Architecture based on virtual paths", vol. 38, No. 8, Aug. 1990; pp. 1212-1222, Aug. 1990, New York, US K. I. Sato et al, IEEE Transactions On Communications.
"The Virtual Path Identifier and its Applications for routeing and Priority of Connectionless and Connection-orientated Services" p. 258, right-hand column, line 25, p. 259, left-hand column, line 5; p. 260, left-hand column, lines 14-21, International Journal Of Digital and Analog Cabled Systems, vol. 1, 1988, pp. 257-262, John Wiley & Sons, Ltd. US; J. L. Adams.
"An ATM Switching System Based on a distributed control architecture" International Switching Symposium '90, Stockholm, May 28th-Jun. 1st 1990, vol. 5, pp. 21-26; T. Koinuma et al, p. 24, right-hand column, lines 9-22; figure 8.
"A Congestion Control Framework for High Speed integrated packetized Transport", IEEE Globecom 88, vol. 1, Nov. 1988, pp. 203-207; Florida, US; G. Woodruff et al.

*Primary Examiner*—Douglas W. Olms
*Assistant Examiner*—Hassan Kizou
*Attorney, Agent, or Firm*—Antonelli, Terry, Stout & Kraus

[57] ABSTRACT

In a packet network having a plurality of local switching units each connected to a plurality of packet lines and at least one cross-connect unit connected to each local switching unit through at least one transit line having a predetermined transmission capacity, a plurality of virtual paths for interconnecting the plurality of local switching units through the cross-connect unit are defined on each transit line, without fixedly assigning communication bandwidths to individual virtual paths and, in respect of the individual transit lines, values of communication bandwidths assigned to virtual channels which have already been established in virtual paths present on the transit lines are stored. When a request for setting a new call is originated, communication bandwidths of first and second transit lines on which exists a virtual path to form thereon a virtual channel for the call are checked for their margin enough to accept assignment of a bandwidth requested by the call, the first transit line lying between the cross-connect unit and an originating local switching unit and the second transit line lying between the cross-connect unit and a terminating local switching unit. If the first and second transit lines have a margin enough to accept the assignment of a bandwidth requested by the call, the virtual channel for the call is established on the virtual path and values of communication bandwidths assigned to the first and second transit lines are updated.

13 Claims, 16 Drawing Sheets

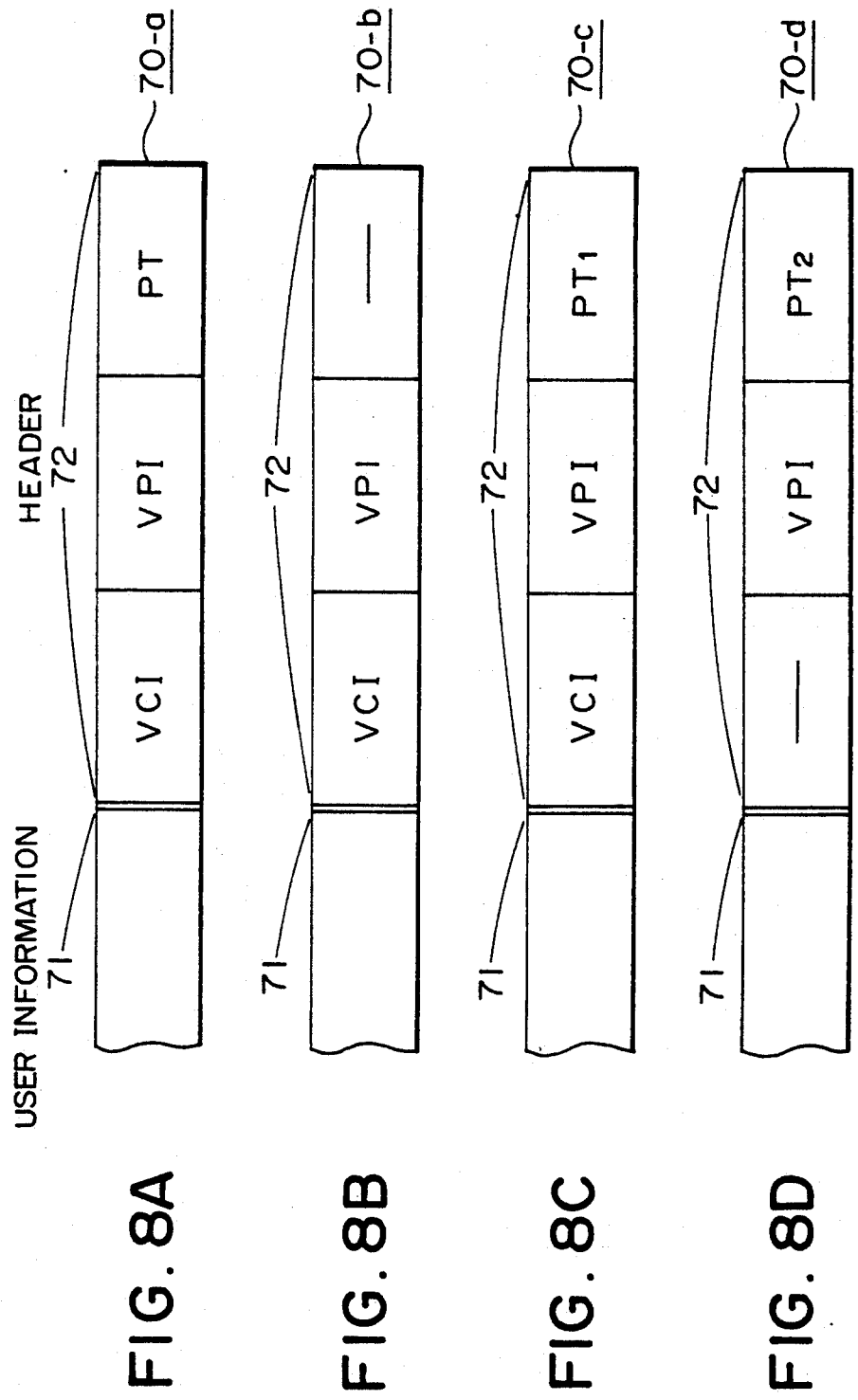

PACKET SWITCHING METHOD AND SYSTEM WITH SELF-ROUTING SWITCH

CROSS-REFERENCE TO RELATED APPLICATION

The present invention relates to subject matter described in application Ser. No. 07/645491 filed Jan. 24, 1991 and entitled "Packet Switching System Having Self-routing Switches" by Shirou Tanabe et al (the corresponding European Patent Application No. 91 100698.9), the disclosure of which is hereby incorporated by reference.

BACKGROUND OF THE INVENTION

1. Field of the Invention

The present invention relates to packet switching method and system and more particularly to packet switching method and system in a packet network comprising a plurality of nodes each including a self-routing switch.

2. Description of the Related Art

It has hitherto been known of transit nodes in the network that there are available a switching station for switching a channel of each call and a cross-connect for semi-fixed connection of paths each having bundled unidirectional channels as described, for example, on pages 13–18 of "Institute of Electronics, Information and Communication Engineers Technical Report, Vol. 88, No. 131, IN88-32-45" Jul. 20, 1988.

Features of each transit node can be summarized as follows:

(1) The switching station has a call processing processor and for each call, translates a terminating address to determine an optimum route.

(2) In the cross-connect, the path is semifixedly established and the cross-connect does not have such a control function for each call as possessed by the tandem station. In a network of ATM (asynchronous transfer mode), the cross-connect transfers an inputted ATM cell to a path selected in accordance with a VPI (virtual path identifier) contained in the inputted cell.

In the network using the switching station as the transit node, routing is carried out for each call and therefore the thus constructed network is highly efficient. However, if all transit nodes are constructed of switching stations, the processing load applied, for call terminating process, on each transit node is increased.

On the other hand, in the network using the cross-connect as the transit node, each cross-connect does not require any processor for call processing and hence reliability of the network as a whole can be improved. However, the path for which the capacity is secured in advance must be established semi-fixedly, thus decreasing utilization efficiency of network resources. More specifically, as compared to the network using the switching station as the transit node, the network cost is disadvantageously increased for the same performance (call block rate) and the call block rate is increased for the same network construction.

SUMMARY OF THE INVENTION.

An object of the invention is to provide packet switching system and packet network, each comprising a plurality of switching units, which are improved in call block rate.

Another object of the invention is to provide packet switching system and method using the cross-connect which, as compared to the prior art, can decrease the network cost for the same performance (call block rate) and can decrease the call block rate for the same network scale.

To accomplish the above object, packet switching system and packet network according to the present invention each comprise a plurality of local switching nodes (or local switching units) each having the call control function and at least one transit node (or tandem unit) constructed of a cross-connect and operative to interconnect the local nodes through transit lines. Any particular local node establishes, relative to a different desired local node, a plurality of logical paths (virtual paths VP's) which pass through the transit node and to which bandwidths are not assigned semi-fixedly in advance. The used bandwidths are managed in respect of individual transit lines on which the logical paths are established. When a request for setting a call is originated from any subscriber line connected to the particular local node and if, at that time, the bandwidth of a transit line on which a logical path exists on which the call is set has a margin enough to accept the use of a bandwidth requested by the call, a virtual channel VC for that call is established on the logical path.

With the aim of establishing a plurality of logical paths between any particular local node and a different local node, in a packet switching system according to one embodiment of the invention, any particular local node includes:

first storage means for storing information concerning port numbers of a plurality of transit lines (hereinafter referred to as transit line numbers) connecting the particular local node and transit nodes;

second storage means for storing information indicative of the connection relation between all transit lines constituting the packet switching system and the transit nodes;

means for notifying the information concerning the transit line numbers stored in the first storage means to a different local node standing for a partner for which logical paths to be established are destined;

means for defining a plurality of logical paths which are to be established between the particular local node and the different local node and which pass through different transit nodes, on the basis of the information concerning the transit line numbers notified from the different local node and the information stored in the first and second storage means; and third storage means for storing information used to define logical paths which are being set or which have been set by the particular local node.

According to another aspect of the invention, any particular local node further includes:

fourth storage means for managing the used status of bandwidth in respect of individual transit lines connected to the transit nodes; and means for responding, during call setting, to the used status of bandwidths of transit lines connected to the originating local node and the used status of bandwidths of transit lines connected to the terminating local node to determine lines which are assignable to the call.

A packet switching method according to the invention for use in a packet network having a plurality of local switching units each connected to a plurality of packet lines, and at least one cross-connect unit connected to each local switching unit through at least one transit line having a predetermined transmission capacity, comprises the following steps:

a first step of defining, on each transit line, a plurality of virtual paths for interconnecting the plurality of local switching units through the cross-connect unit, without fixedly assigning communication bandwidths to individual virtual paths;

a second step of storing, in respect of the individual transit lines, values of communication bandwidths assigned to virtual channels which have already been established in virtual paths present on the transit lines;

a third step of checking, when a request for setting a new call is originated, communication bandwidths of a pair of first and second transit lines, on which virtual path exists on which a virtual channel for the call is to be set up, for their margin enough to accept assignment of a bandwidth requested by the call, the first transit line lying between the cross-connect unit and an originating local switching unit, and the second transit line lying between the cross-connect unit and a terminating local switching unit; and a fourth step of establishing, if the first and second transit lines have a margin enough to accept the assignment of a bandwidth requested by the call, the virtual channel for the call on the virtual path and updating values of communication bandwidths assigned to the first and second transit lines.

In case where the packet network has a plurality of cross-connect units each connected to the individual local switching units through at least one transit line having a predetermined transmission capacity, in the first step, a plurality of virtual paths are defined between each local switching unit and a different desired local switching unit through different cross-connect units;

in the second step, an originating local switching unit connected to a packet line originating a new call selects a plurality of first transit lines each having a margin enough to accept assignment of a bandwidth requested by the call as candidates for originating transit lines on which a virtual channel for the call is to be established, and the selected candidates for transit liens are notified to a terminating local switching unit; and the terminating local switching unit selects a plurality of second transit lines each having a margin enough to accept assignment of the bandwidth requested by the call as candidates for terminating transit lines on which a virtual channel for the call is to be established, and collates the candidates for originating transit lines with the candidates for terminating transit lines to specify a pair of first and second transit lines on which exists a virtual path to form thereon the virtual channel for the call.

In the packet network and switching system according to the invention, any particular local node can recognize combinations of logical paths which are to be established between the particular local node and a different local node, on the basis of numbers possessed by transit lines connected to the different local node and notified from the different local node, numbers possessed by transit lines connected to this local node and information indicative of the connection relation between all transit lines constituting the packet switching system and the transit nodes.

According to the invention, each logical path is established with its bandwidth (transmission capacity) unsettled, and when establishment of a logical channel (virtural channel) is requested and if, at that time, the transmission capacity of a transit line on which a logical path exists on which the logical channel is to be established has a margin, the logical channel is established on the logical path, thereby making it possible to make the most of the bandwidth of each transit line. Exemplarily, for establishment of logical channel, while an originating local node notifies to a terminating local node the status of bandwidth assignment of candidates for transit lines which are selected from transit lines connected to the originating local node and which are settable with the logical channel, the terminating local node selects transit lines to be assigned with the logical channel, on the basis of the notified status of bandwidth assignment of transit lines and the status of bandwidth assignment of candidates for transit lines which are selected from transit lines connected to the terminating local node and which are settable with the logical channel and establishes the logical channel on a logical path present on the selected transit lines. It is to be noted that the terminating local node notifies the originating local node of the results of selection and after assignment of the logical channels, management information indicative of the status of bandwidth assignment of the transit lines is updated in both the local nodes.

The above-described logical channel assignment can also be applied to a packet network or a packet switching system of the type in which part of logical paths are assigned with bandwidths semi-fixedly in advance but the remaining logical paths are not subjected to the bandwidth assignment.

The logical paths may precedently be classified into logical paths having high priority class and logical paths having low priority class and in each transit node and each local node, switching processing of packets on the logical paths of high priority class may be carried out in preference to that of packets on the logical paths of low priority class.

The foregoing and other objects, advantages, manner of operation and novel feature of the present invention will be understood from the following detailed description when read in connection with the accompanying drawings.

BRIEF DESCRIPTION OF THE DRAWINGS

FIG. 8A is a diagram showing a basic format of a packet;

FIG. 8B is a diagram showing a format of a packet on a subscriber line or a transit line;

FIG. 8C is a diagram showing a format of a packet in the local node;

FIG. 8D is a diagram showing a format of a packet in the transit node;

DESCRIPTION OF THE PREFERRED EMBODIMENTS

1. Explanation of Construction

Construction of Packet Network

Figure 2:
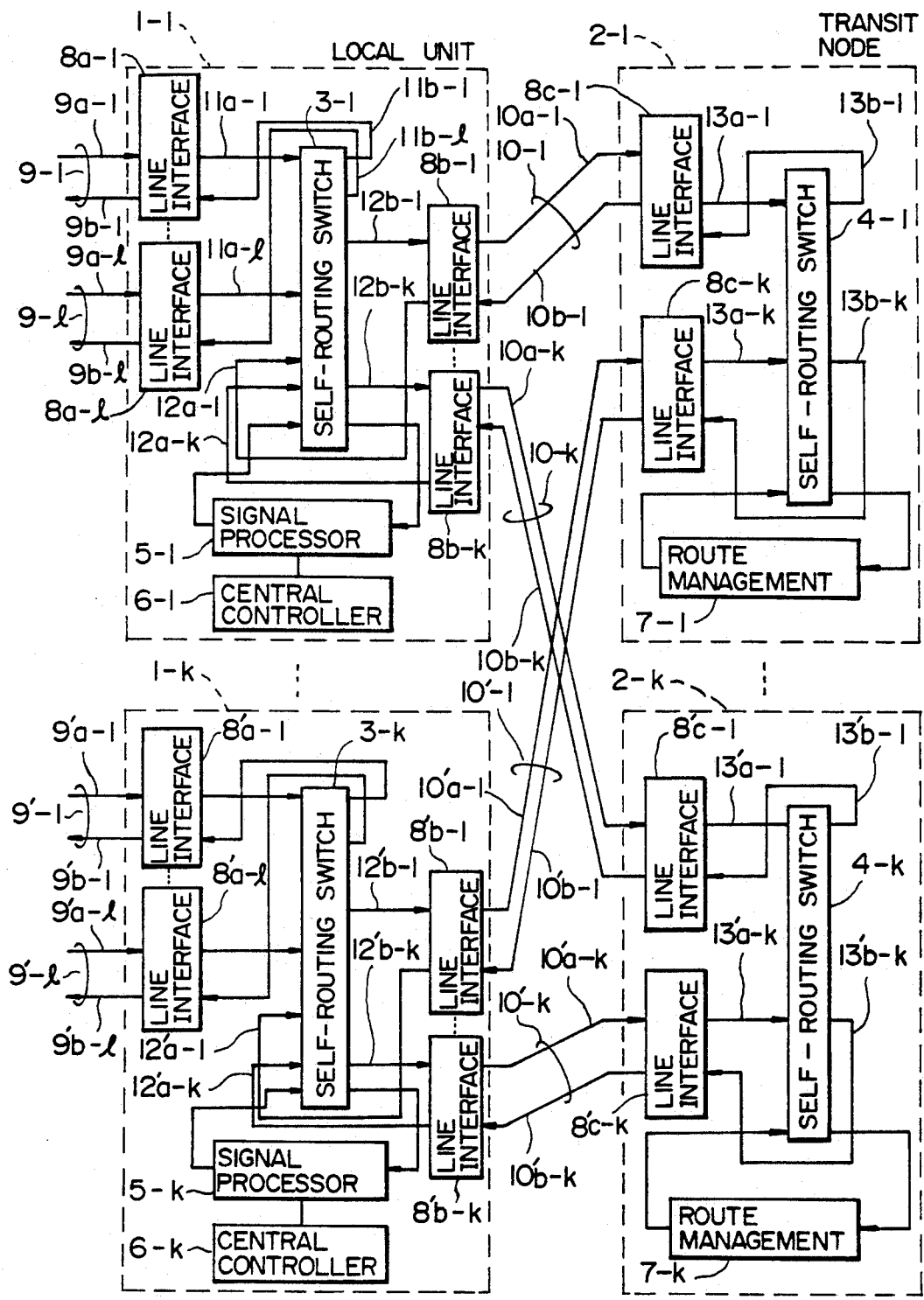
FIG. 2 is a block diagram showing the construction of packet switching system and packet network according to the invention.

FIG. 2 shows an example of construction of a packet network to which the present invention is applied. The packet network comprises a plurality of local nodes 1-1 to 1-k generally designated by reference numeral 1 and each connected with a plurality of subscriber lines (optical fibers) 9-1 to 9-1 or 9'-1 to 9'-1, generally designated by reference numeral 9, and a plurality of transit nodes 2-1 to 2-k generally designated by reference numeral 2 and operative to interconnect one local node to another through transit lines 10-1 to 10'-k, generally designated by reference numeral 10. The plurality of transit nodes may be combined into a single tandem unit and the tandem unit may be used in combination with the plurality of local nodes to form a single, large-capacity packet switching system.

Each local node 1 includes a plurality of line interfaces 8a (8a-1 to 8a-1 or 8'a-1 to 8'a-1) adapted to perform terminating process for the respective subscriber lines 9 (9-1 to 9-1 or 9'-1 to 9'-1) and label converting process for an input packet (input cell) from the individual subscriber lines 9 (9-1 to 9-1 or 9'-1 to 9'-1), a plurality of line interfaces 8b (8b-1 to 8b-k or 8b'-1 to 8b'-k) connected to a plurality of transit lines 10 (10-1 to 10-k or 10'-1 to 10'-k) corresponding to the transit node 2-1 or 2-k, a self-routing switch 3 (3-1 or 3-k) being operative by self-routing to deliver (switch) an input packet from a line interface 8a or 8b to another line interface, a signal processor 5 (5-1 or 5-k) operative to perform terminating process of a control signal inputted through the respective line interfaces, and a central controller 6 (6-1 or 6-k) adapted to perform call processing control and resource management.

Each subscriber line 9 includes incoming lines 9a (9a-1 to 9a-1 or 9a'-1 to 9a'-1) and outgoing lines 9b (9b-1 to 9b-1 or 9b'-1 to 9b'-1), and each transit line 10 likewise includes incoming lines 10a (10a-1 to 10a-k or 10a'-1 to 10a'-k) and outgoing lines 10b (10b-1 to 10b-k or 10b'-1 to 10b'-k).

Each transit node 2 includes a plurality of line interfaces 8c (8c-1 to 8c-k or 8c'-1 to 8c'-k) provided in association with the transit lines 10 (10-1 to 10'-k), a self-routing switch 4 (4-1 or 4-k), and a route management 7 (7-1 or 7-k) adapted to perform initialization of parameters in various tables to which each line interface refers.

Any local node 1-i is connected to the plurality of transit nodes 2-1 to 2-k through the plurality of transit lines 10-1 to 10-k so that a plurality of routes passing through different transit nodes may exist between any two local nodes.

Construction of Line Interface

Figure 3:
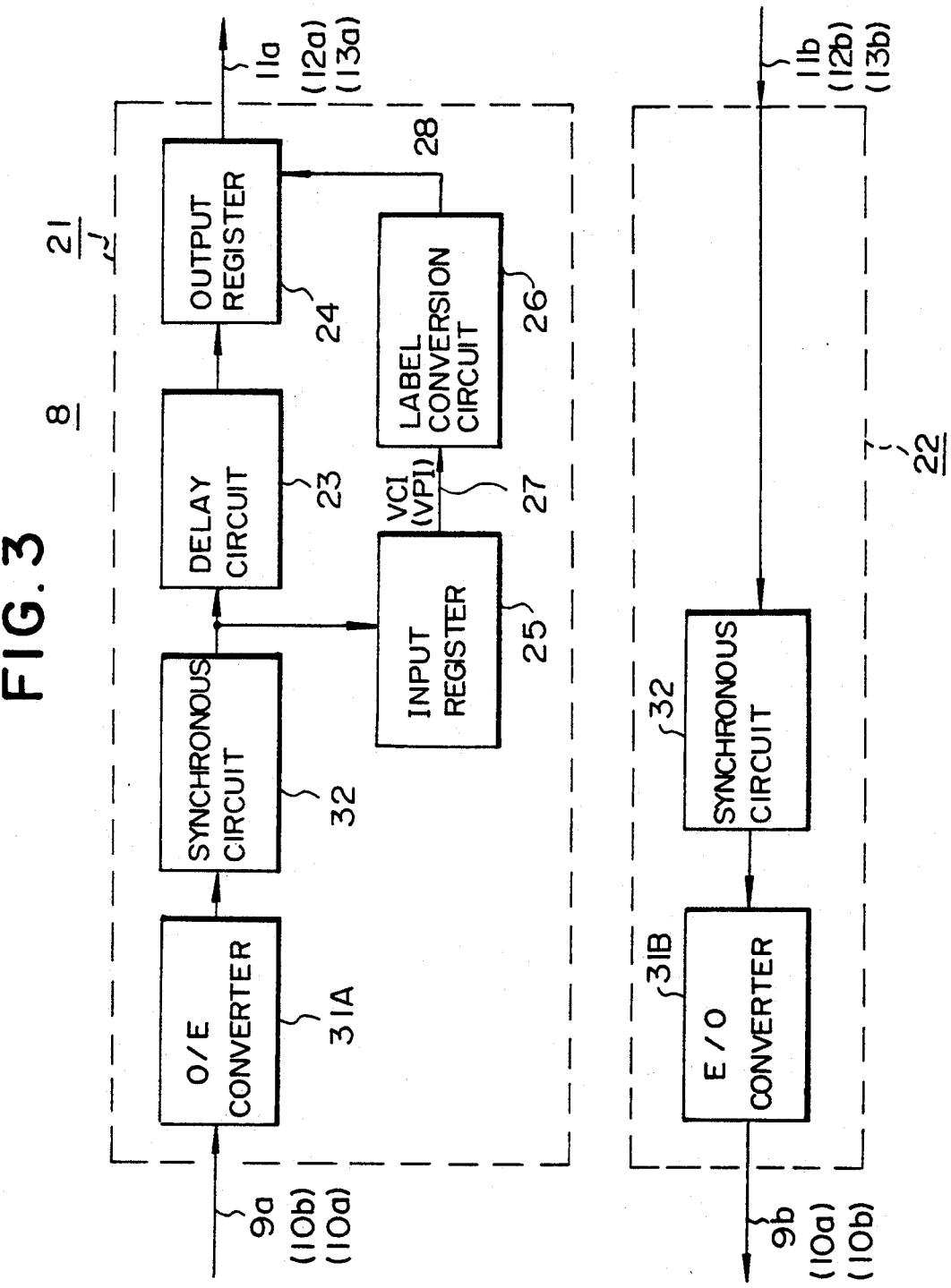
FIG. 3 is a block diagram showing details of a line interface 8 in FIG. 2.

FIG. 3 shows a circuit construction of the line interface 8 (8a, 8b or 8c). Each line interface includes an upward circuit 21 for transferring a cell inputted from the incoming line (9a, 10b or 10a) to an input line (11a, 12a or 13a) of the self-routing switch 3 or 4, and a downward circuit 22 for transferring a cell from an output line (11b, 12b or 13b) of the self-routing switch 3 or 4 to the outgoing line 9b of subscriber line or the outgoing line 10a or 10b of transit line.

The downward circuit 22 is comprised of a synchronous circuit 32 adapted to perform synchronous controlling process for an input signal from the self-routing switch and an E/O converter 31B for converting an electrical signal delivered out of the synchronous circuit into an optical signal and transferring the optical signal to the outgoing line 9b, 10a or 10b.

The upward circuit 21 is comprised of an O/E converter 31A for converting an optical signal inputted from the incoming line 9a, 10b or 10a into an electrical signal, a synchronous circuit 32 adapted to perform synchronous controlling process for the signal from the O/E converter, an input register 25 for temporarily holding the input packet-(cell) delivered out of the synchronous circuit, a delay circuit 23 for delaying the input packet by a predetermined time and supplying the delayed input packet to an output register 24, and a label conversion circuit 26 connected between the input register 25 and output register 24.

The input register 25 of the line interface 8a or 8b extracts a VCI (virtual channel identifier) from a header of the input packet to deliver it onto a data output line 27, and the input register 25 of the line interface 8c extracts a VPI (virtual path identifier) from a header of the input packet to deliver it onto a data output line 27. The label conversion circuit 26 is accessed by using the VCI or VPI as a read address and header information read out of the label conversion circuit 26 is supplied to the output register 24 through a data output line 28. The output register 24 converts a part of the header of the input packet supplied from the delay circuit 23 into the header information inputted from the data output line 28, so that the packet subjected to header conversion is delivered to the output line 11a, 12a or 13a.

Construction of Label Conversion Circuit

Figure 4:
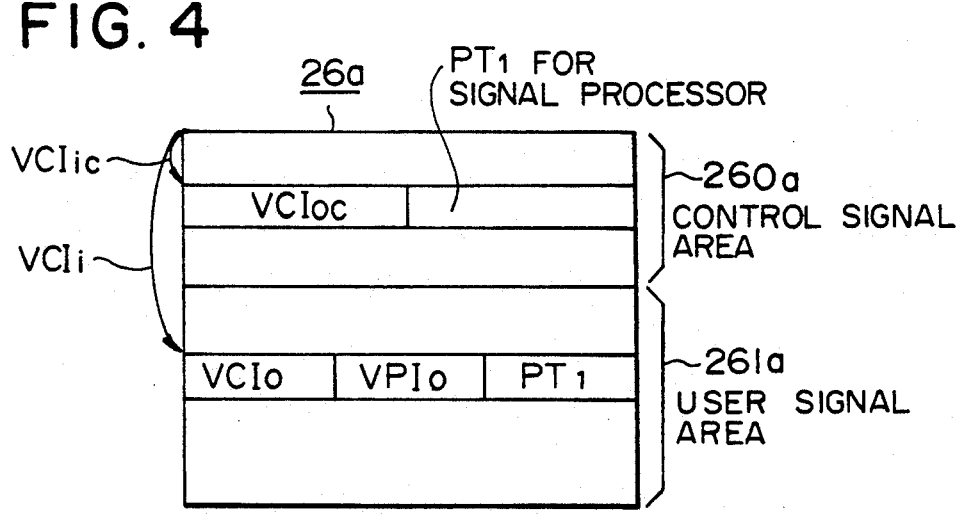
FIG. 4 is a diagram showing the construction of a label conversion table provided in a line interface connected to a subscriber line.
Figure 5:
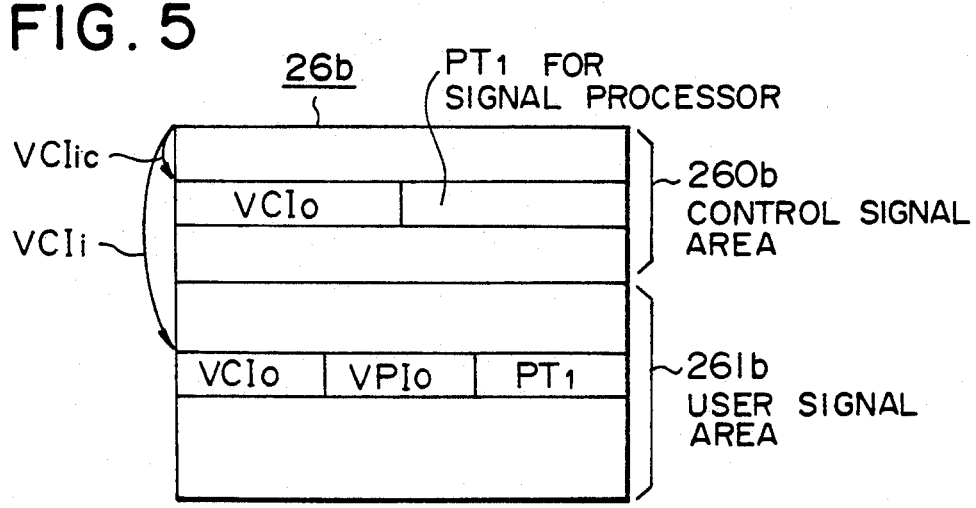
FIG. 5 is a diagram showing the construction of a label conversion table provided in a line interface on the transit line side of a local node.
Figure 6:
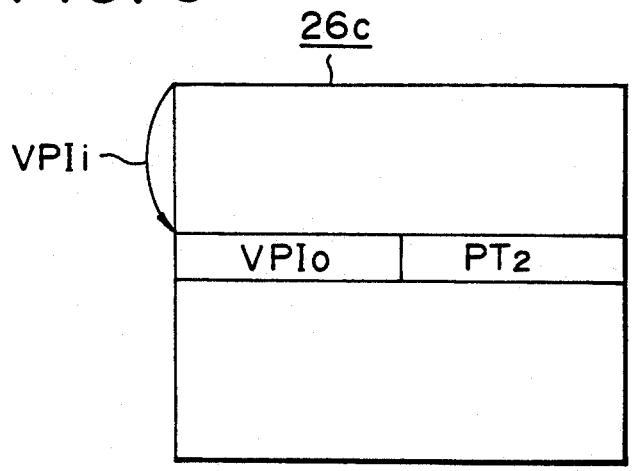
FIG. 6 is a diagram showing the construction of a label conversion table provided in a line interface of a transit node.

FIGS. 4 and 5 show the contents of label conversion tables 26a and 26b, respectively, in the line interfaces 8a and 8b constituting each local node, and FIG. 6 shows the contents of label conversion table 26c in the line interface 8c constituting each transit node.

Each of the label conversion tables 26a and 26b provided in the local node is divided into a control signal area 260 and a user signal area 261.

In order to perform terminating process for all control signal packets in the local node, control signal area 260a of the label conversion table 26a is set as shown in FIG. 4, at an address position corresponding to an input VCI (VCIic) contained in each input control signal packet on the respective subscriber lines 9a (9a-1 to 9a-l; 9'a-1 to 9'a-l), with a VCI (VCIoc) which is unique to the signal processor 5 and a self-routing switch output port number (PT1) which is so fixed that each input control signal packet can be handed over to the signal processor 5.

User signal area 261a is set, at an address location corresponding to an input VCI (VCIi) contained in each input packet on the respective subscriber lines 9a (9a-1 to 9a-l; 9'a-1 to 9'a-l), with a VI (VCIo) which is effective between this local node and a terminating local node, a VPI (VPIo) which is effective between this local node and the transit nodes, and an output port number (PT1) for designating an output port of self-routing switch 3 to which the input packet is to be delivered.

The label conversion table 26b on the transit line side has control signal area 260b which is structurally identical, as shown in FIG. 5, to the control signal area 260a of the label conversion table 26a. User signal area 261b is set, at an address location corresponding to a VCI (VCIi) contained in an input packet from the respective transit lines 10b (10b-1 to 10b-k; 10'b-1 to 10'b-k), with a VCI (VCIo) and VPI (VPIo) which are effective on the respective subscriber lines 9b (9b-1 to 9b-l; 9'b-1 to 9'b-l), and an output port number (PT1) for designating an output port of self-routing switch 3 to which the input packet is to be delivered.

As shown in FIG. 6, the label conversion table 26c provided in the transit node 2 is set, at an address location corresponding to a VPI (VPIi) contained in an input packet from the respective transit lines 10a (10a-1 to 10a-k; 10'a-1 to 10'a-k), with a VPI (VPIo) which is effective between this transit node and a terminating local node, and an output port number (PT2) for designating an output port of self-routing switch 4 to which the input packet is to be delivered.

Construction of Self-routing Switch

Each of the self-routing switches 3 and 4 is a packet switch which is so operated as to respond to an output port number (PT) contained in the header of an input packet to select an output line to which the input packet is to be delivered and it may be constructed of a single unit switch or a plurality of unit switches.

Figure 7:
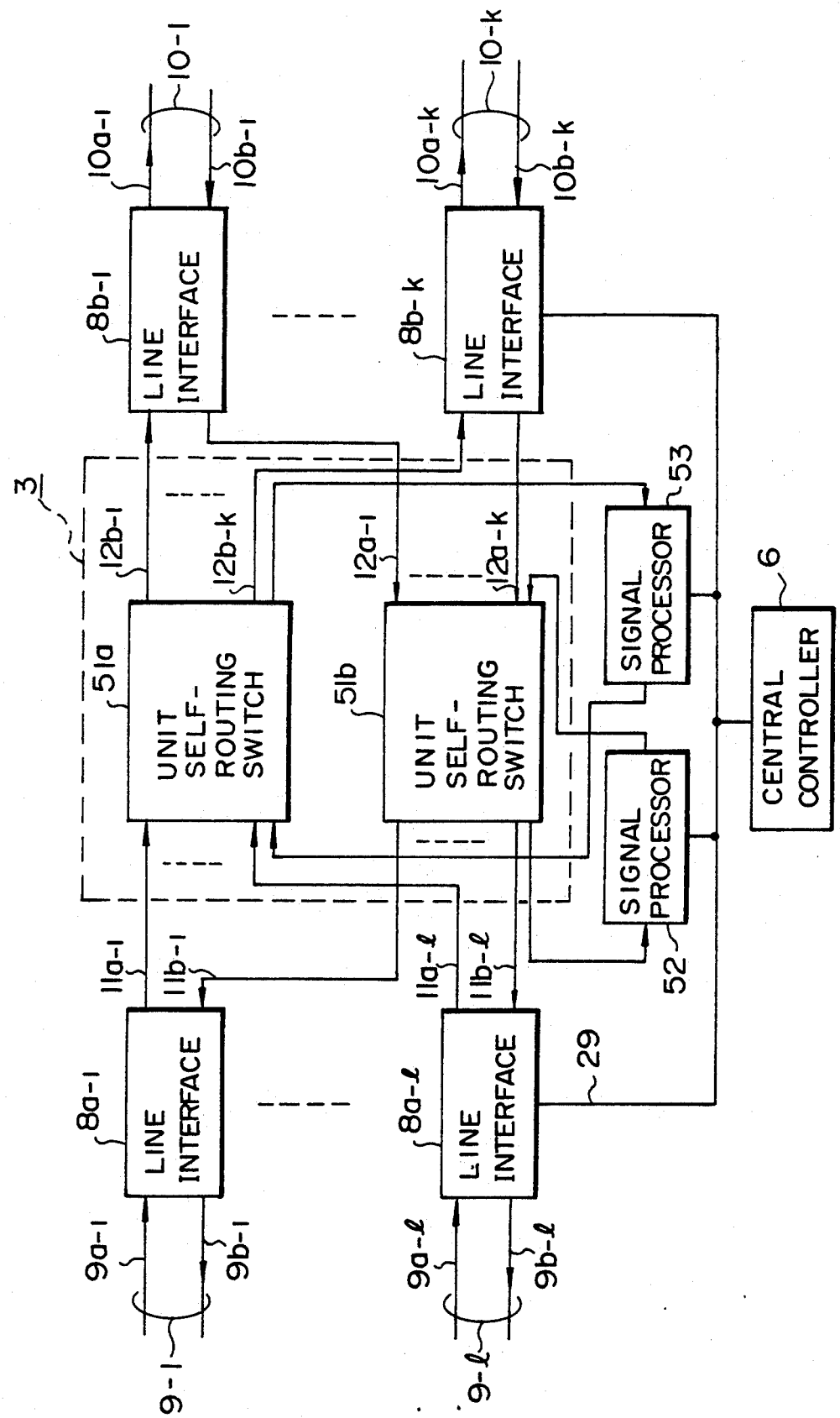
FIG. 7 is a block diagram showing the construction of a local node.

As shown in FIG. 7, the self-routing switch 3 constituting the local node 1 includes a unit self-routing switch 51a for upward circuit connected to receive the output lines 11a (11a-1 to 11a-l) of upward circuits of the respective line interfaces 8a (8a-1 to 8a-l) on the subscriber side which are connected to the incoming subscriber lines 9a (9a-1 to 9a-l), and a unit self-routing switch 51b for downward circuit connected to receive the output lines 12a (12a-1 to 12a-k) of upward circuits of the respective line interfaces 8b (Sb-1 to 8b-k) on the transit line side which are connected to the incoming transit lines 10b (10b-1 to 10b-k).

The output lines 12b (12b-1 to 12b-k) of the unit self-routing switch 51a are connected to the downward circuits of respective line interfaces 8b (8b-1 to 8b-k) on the transit line side which are connected to the outgoing transit lines 10a (10a-1 to 10a-k), and the output lines 11b (11b-1 to 11b-l) of the unit self-routing switch 51b are connected to the downward circuits of respective line interfaces 8a (Sa-1 to 8a-l) on the subscriber side which are connected to the outgoing subscriber lines 9b (9b-1 to 9b-l).

The unit self-routing switches 51a and 51b are respectively connected with the signal processor 53 for upward circuit and signal processor 52 for downward circuit, and these signal processors 53 and 52 are coupled to the central controller 6 through a processor bus 29.

Packet Format

FIG. 8A shows a basic format of 70-a of a packet. Each packet consists of user information area 71 and header 72, the header 72 having a VCI field, a VPI field and a PT field.

FIG. 8B shows a format 70-b of a packet on the subscriber line and transit line. In the header 72, the VCI field and the VPI field are effective.

FIG. 8C shows a format 70-c of a packet inside the local node 1. In the header 72, all of the fields are effective with the PT field set with an output port number PT1 for designating an output port of self-routing switch 3 to which the packet is to be delivered.

FIG. 8D shows a format 70-d of a packet inside the transit node 2. In the header 72, only the VPI and PT fields are effective with the PT field set with an output port number PT2 for designating an output port of self-routing switch 4 to which the packet is to be delivered.

2. Explanation of Procedure

Construction of VP

Figure 1:
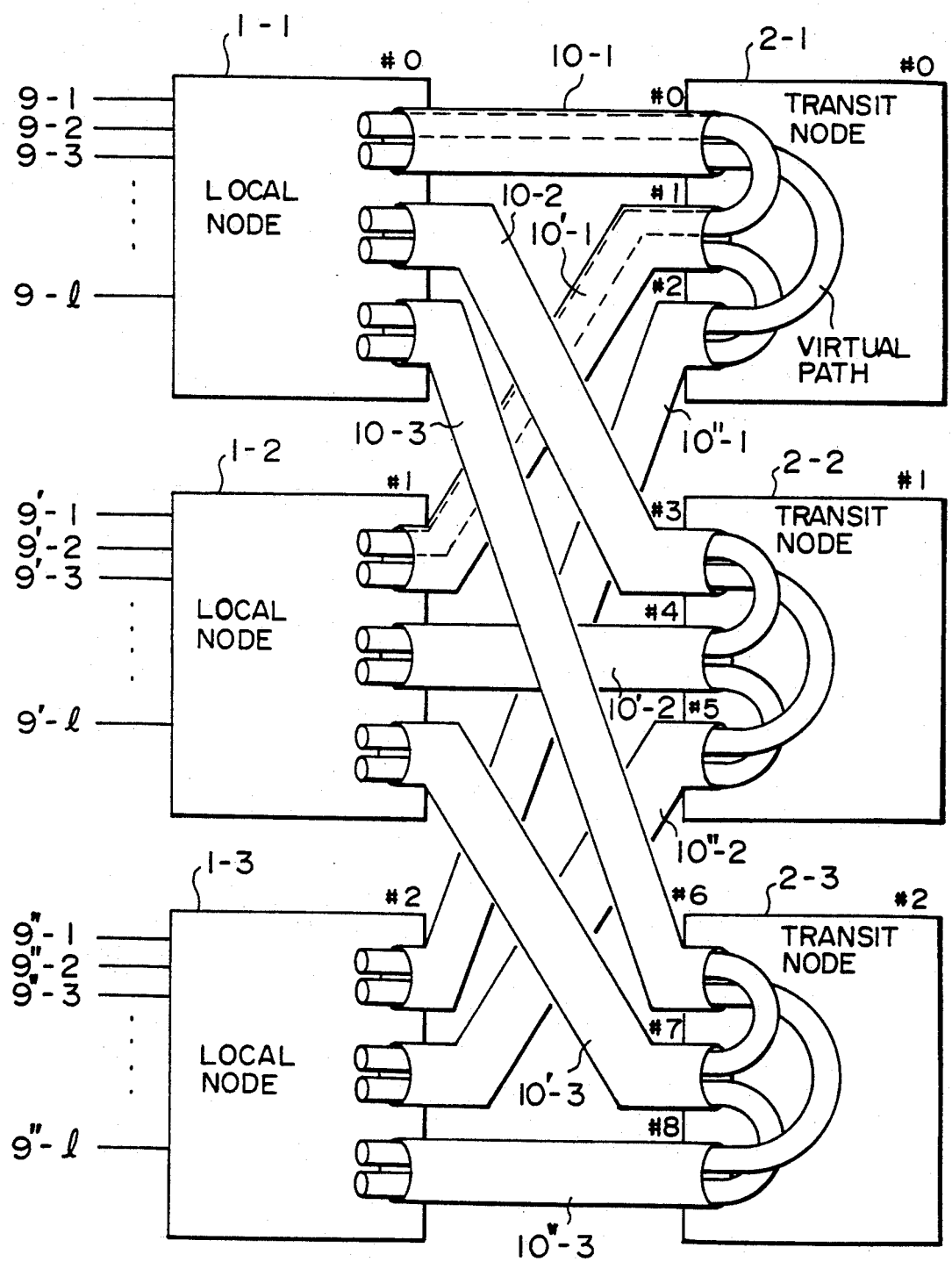
FIG. 1 is a diagram for explaining the construction of virtual path (VP) in a packet network to which the present invention is applied.

An example of VP construction is shown in FIG. 1. This example is directed to a packet network comprising three local nodes 1 (1-1 to 1-3) and three transit nodes 2 (2-1 to 2-3), wherein the VP is so constructed that a packet supplied from any particular local node to any transit node can be delivered to a desired line destined for a different local node. It is to be noted that the number of transit nodes 2 may be smaller than that of local nodes 1.

In the present invention, the operation mode of the network is classified into a mode (basic mode procedure) in which a VC is set up on each VP without applying fixed bandwidth assignment to all VP's in advance, a mode (application mode procedure 1) in which a VC is set up on each VP while applying fixed bandwidth assignment to one or more of specified VPs in advance, and a mode (application mode procedure 2) in which high priority class/low priority class is set for the individual VP's in the basic mode procedure or application mode procedure 1. The local nodes 1, transit nodes 2 and transit lines 10 are assigned with local node numbers, transit node numbers and transit line numbers, that is, identification numbers for the nodes and lines which are consecutive numbers unique to the packet network.

The communication procedure in each mode will now be described.

2.1 Basic Mode Procedure (a mode in which fixed bandwidth assignment is not applied to all VP's)

VP Establishment Procedure

Figure 9A:
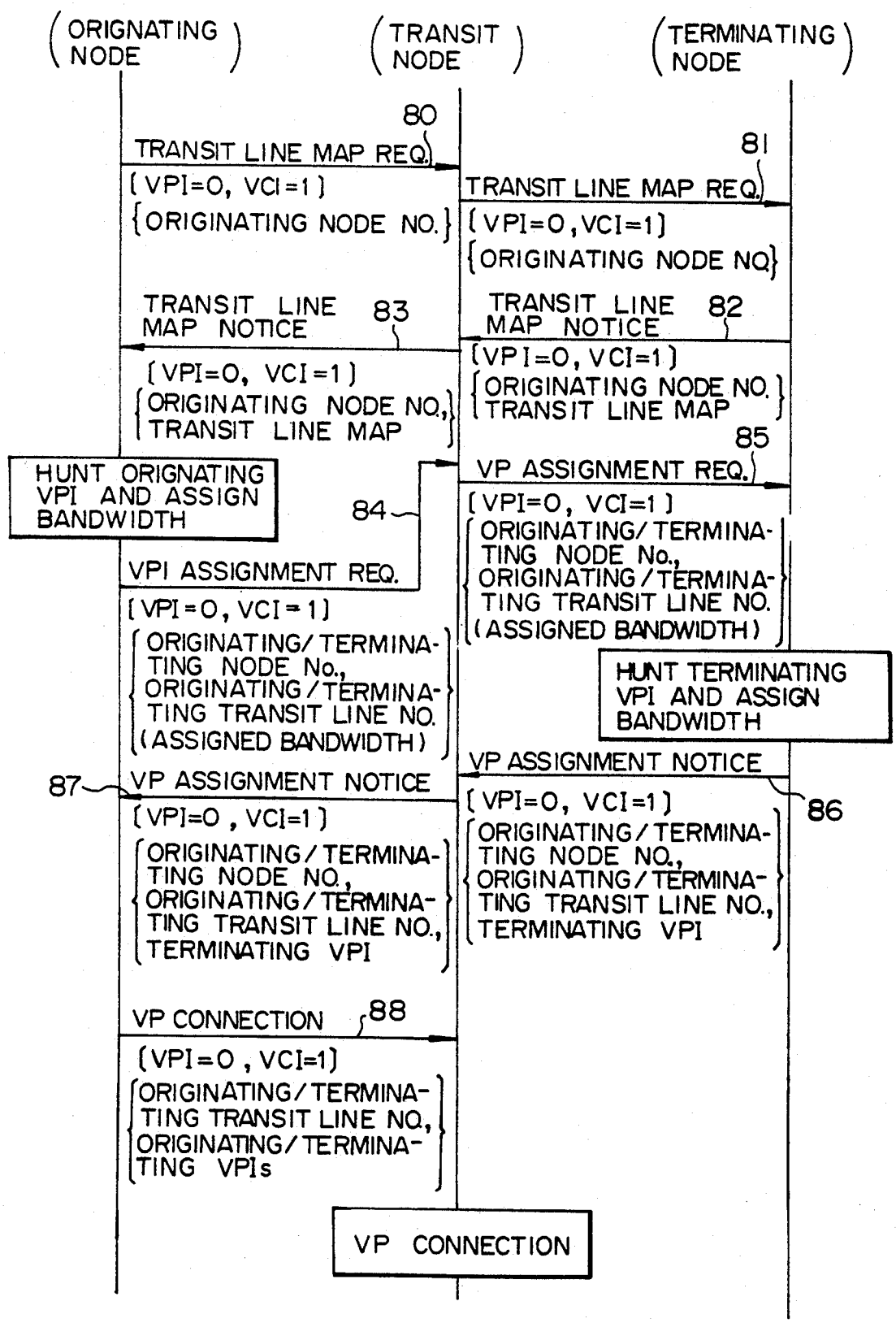
FIGS. 9A and 9B are sequence diagrams showing the procedure for establishment of VP and SVC.
Figure 9B:
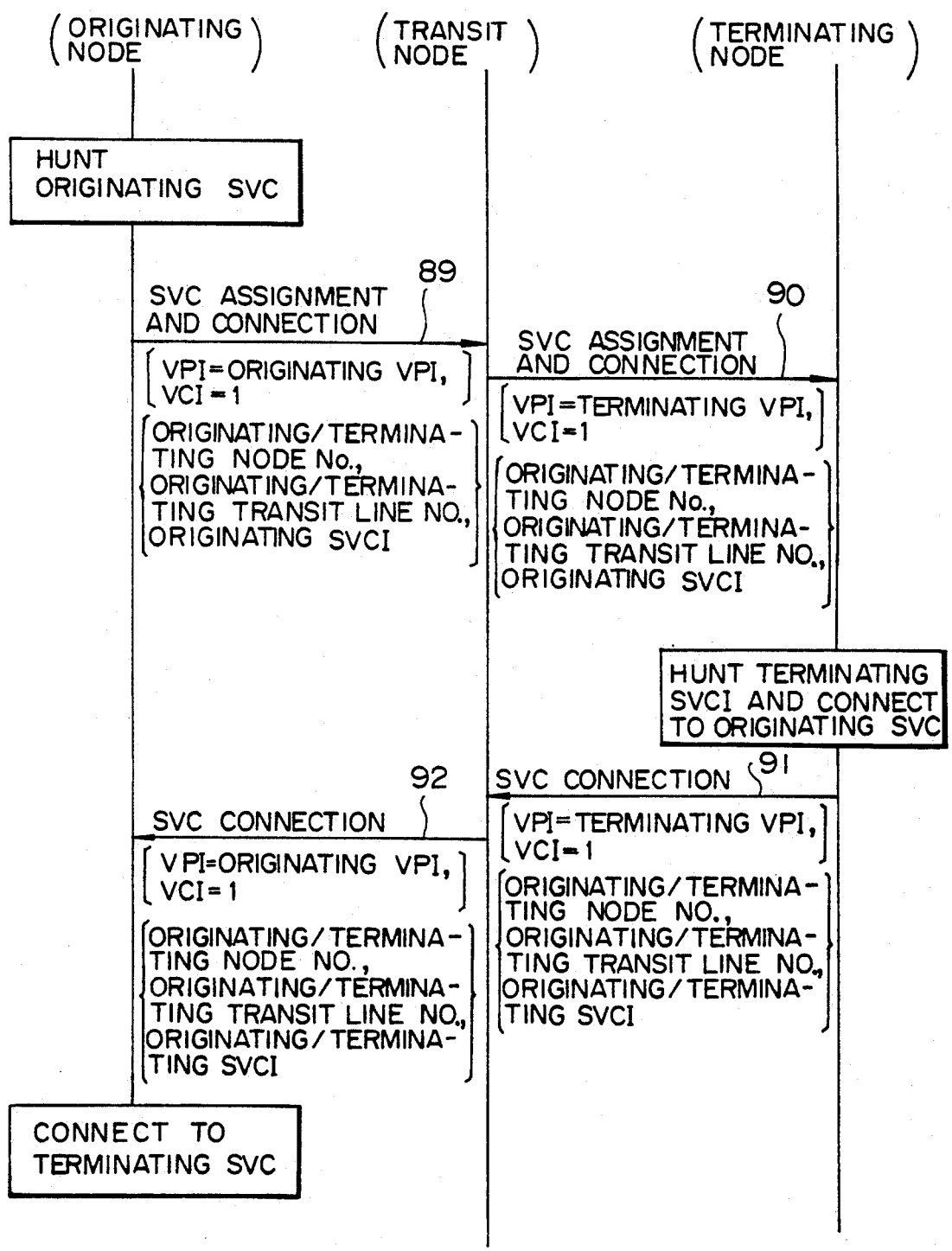

FIGS. 9A and 9B show sequence of the VP establishment procedure in the basic mode procedure. This procedure enables each local node to define the VP as shown in FIG. 1 on individual transit lines upon commencement of working of the network. In the following description, a local node operative to commence or start control operation in accordance with the VP establishment procedure is called an "originating local node" and a local node operative to respond to a control signal from the originating local node to execute the control operation in accordance with the VP establishment procedure is called a "terminating local node".

Figure 10:
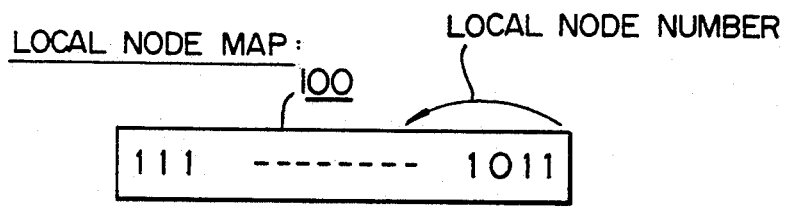
FIG. 10 is a diagram showing a local node map.

Central controller 6-i of an originating local node 1-i first looks up a local node map 100 as shown in FIG. 10 to retrieve identification numbers of the other local nodes constituting the current packet network (or packet switching system). The local node map 100 contains, at a bit position corresponding to each local node number, information of which "1" indicates that a local node having the corresponding local node number is packaged in the packet network and "0" indicates that such a local node as above is not packaged.

The originating local node transmits to a desired transit node 2-n one of control packets which designates any local node retrieved from the local node map 100 as a terminating local node 1-j and which packet is defined as a "packet requesting a map of transit lines". The packet requesting a map of transit lines contains VPI=0, and VCI=1 in its header (hereinafter symbolized by [ ]) and originating/terminating local node numbers in its user information area (hereinafter symbolized by { })(step 80).

The "packet requesting a map of transit lines" is fetched by a line interface 8c-i of the transit node 2-n and the contents (VPIi) of VPI field of the header is separated from the packet: and a value of the VPIi is supplied as a read address to the label conversion table 26c through the data line 27.

Figure 11:
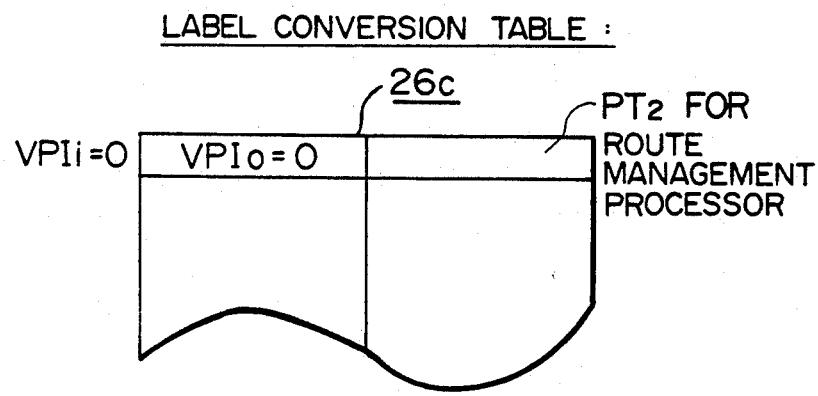
FIG. 11 is a diagram showing the construction of a label conversion table provided in the originating local node.

In the label conversion table 26c, "VPIo=0" and "PT2=output port number destined for route management processor 7" are fixedly set as shown in FIG. 11 at a storage position of address VPIi=0. Accordingly, the VPIo(=0) and PT2(=output port number destined for route management processor) are read from the label conversion table 26c and these values are supplied to the output register 24 through the data line 28. Through this operation, the VPI and PT fields in the header of the "packet requesting a map of transit lines" inputted to the output register through the delay circuit are updated. The packet subjected to the header conversion is fetched into the route management processor 7-n by means of the self-routing switch 4-n.

Figure 12:
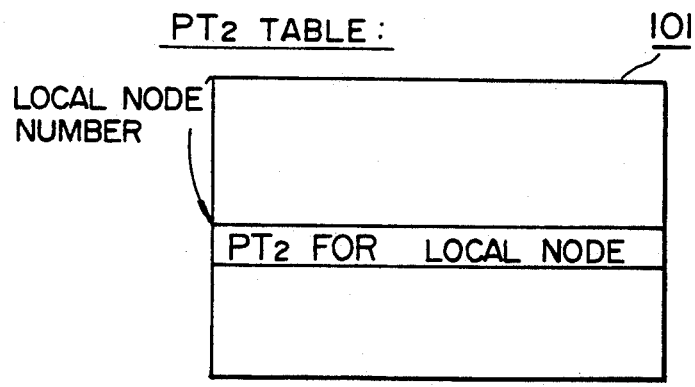
FIG. 12 is a diagram showing the construction of a PT2 table.

The route management processor 7-n includes as shown in FIG. 12 a PT2 table 101 for storing the correspondence relation between the local node number and the output port number indicative of an output port destined for the local node. When receiving the "packet requesting a map of transit lines", the route management processor 7-n looks up the PT2 table 101 to retrieve an output port number PT2 corresponding to the node number of the terminating local-node 1-j contained in the user information of the received packet and sends again to the self-routing switch 4-n a packet subjected to the header conversion for replacement of the PT field of the received packet with the aforementioned PT2. In this manner, the "packet requesting a map of transit lines" is relayed to the terminating local node 1-j (step 81).

Figure 13:
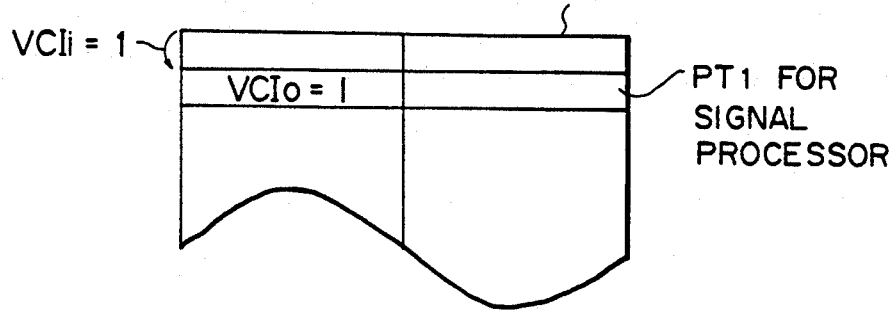
FIG. 13 is a diagram showing the construction of a label conversion table provided in the terminating local node.

Line interface 8b-n of the terminating local node 1-j receiving the "packet requesting a map of transit lines" includes as shown in FIG. 13 a label conversion table 26b in which "VCIo=1" and "PT1=output port number destined for signal processor 52" are fixedly set at a storage position of address (VCIi)=i. When receiving the "packet requesting a map of transit lines", the terminating local node 1-n determines an output port number PT1 corresponding to the value (VCIi) of VCI field of the packet from the label conversion table 26b, updates the PT field of the received packet to the output port number PT1 and thereafter supplies the updated packet to the self-routing switch 3-j (unit self-routing switch 51b in FIG. 7). In this manner, the "packet requesting a map of transit lines" can be fetched into the signal processor 52 through the unit self-routing switch 51b.

The signal processor 52 has the function of performing such processes as assembling of the packet received from the self-routing switch into a frame, disassembling of the frame received from the central controller 6 into one or-more packets and LAPD (link access procedure on the D-channel) and it converts information contained in the "packet requesting a map of transit lines" into a frame of predetermined format which in turn is transferred to the central controller 6.

Figure 14:
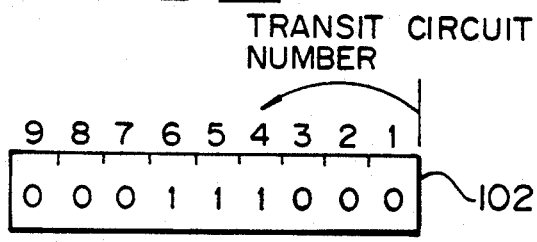
FIG. 14 is a diagram showing the construction of a transit line map.

Like the central controller of the other local nodes, the central controller 6-j of the terminating local node 1-j includes a transit line map 102 as shown in FIG. 14 for storing the connection relation between all transit lines 10-1 to 10'-k in the network and this local node 1-j. The transit line map 102 stores, at a bit position corresponding to a transit line number, "1" to indicates that a transit line having that transit line number is connected to this local node 1-j and "0" to indicate that the transit line of that transit line number is not connected to this local node 1-j.

The central controller 6-j responds to the transit line map request from the originating local node 1-i to generate a "packet notifying a map of transit lines" containing [VPI=0, VCI=i] in header 72 and {originating/terminating local node number and the contents of transit line map 102} in user information 71, and transmits the packet to the self-routing switch 3-j through the signal processor 53 (step 82). The "packet notifying a map of transit lines" is relayed by means of line interface 8b-n and transit node 2-n so as to be transferred to the central controller 6-i of the originating local node 1-i (step 83).

Figure 15:
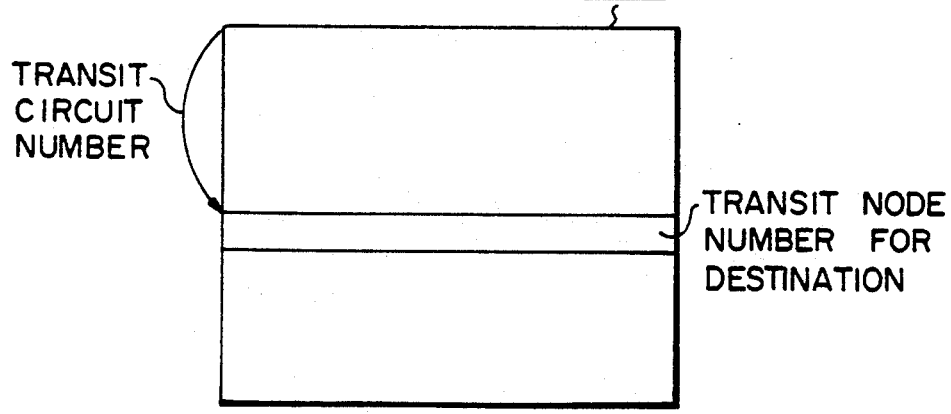
FIG. 15 is a diagram showing the construction of a transit node map.

In addition to the previously-described local node map 100, the central controller 6-i of the originating local node 1-i includes a transit node map 103 as shown in FIG. 15 for storing the correspondence relation between numbers of all transit lines in the network and numbers of transit nodes connected to these transit lines (numbers of transit nodes to be connected).

On the basis of the transit line map transferred from terminating local node 6-j and the transit node map 103, the central controller 6-i recognizes the relation between the transit lines 10'-1 to 10'-k on the terminating local node side and the transit node numbers to be connected with these transit lines. Subsequently, on the basis of the transit line map 102 and transit node map 103 possessed by this local node, the central controller 6-i recognizes the relation between the transit lines 10-1 to 10-k and the transit node numbers to be connected with these transit lines. By matching the two recognition results, some sets of transit line numbers on the originating and terminating sides which are connected to the same transit node can be known. Such sets of originating and terminating side transit lines as connected to the same transit node are treated as objects of VP establishment.

Figure 16:
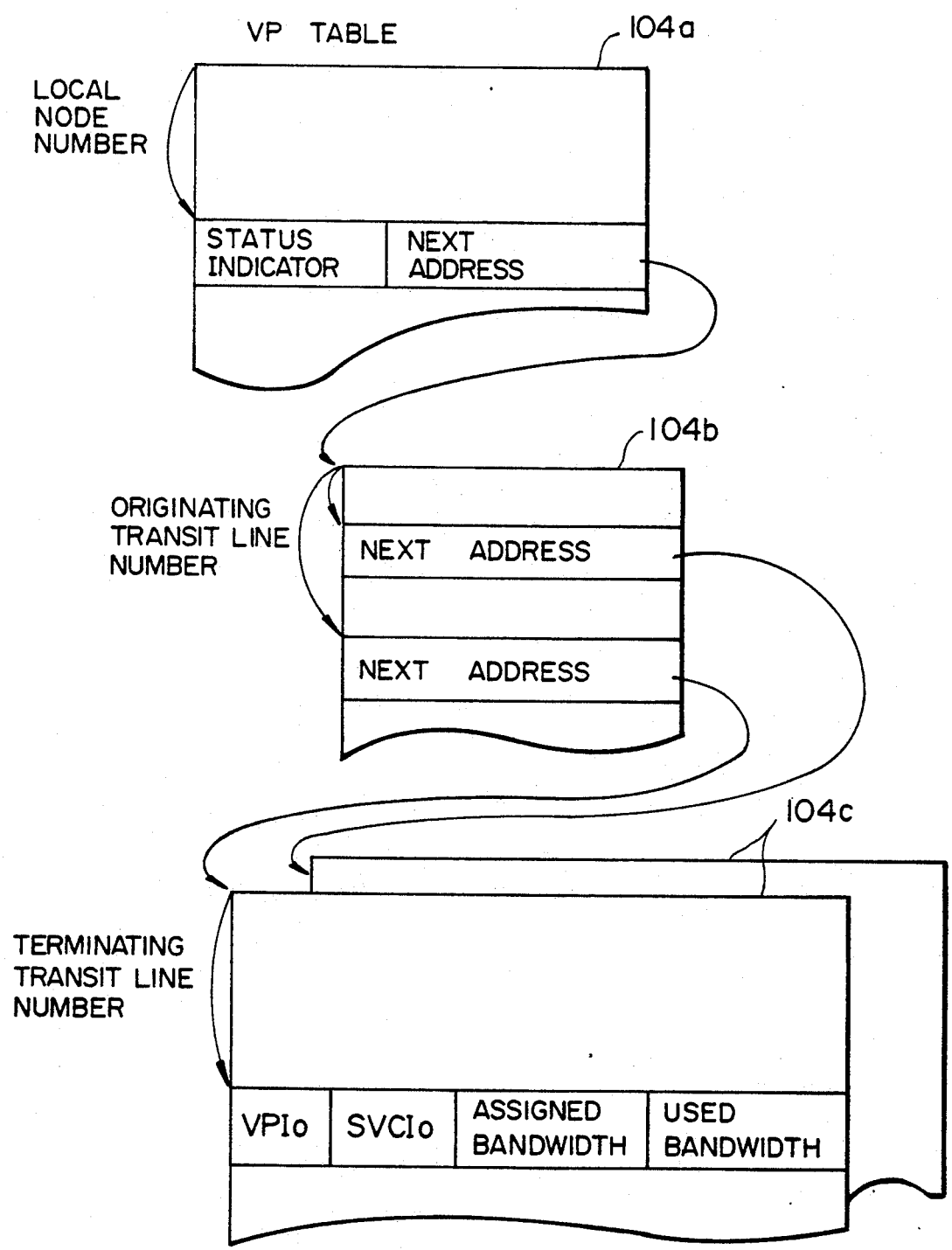
FIG. 16 is a diagram showing the construction of a VP table.

Subsequently, in connection with one originating side transit line selected from the aforementioned sets, an unused (empty) VPI (in the following description, a VPI to be used between the originating local node and the transit node will be called an "originating VPI") is hunted and information necessary for that VPI is registered in a VP table as designated at 104a to 104c in FIG. 16. More particularly, the table 104a is stored, at a storage location designated by an address="terminating local node number", with a status indication bit ("1") indicating that VP establishment is in operation and a pointer address (next address) indicative of a position in the table block 104b to be referred to successively. In connection with a plurality of originating transit lines on which the VP destined for the terminating local node is established, the table block 104b is stored, at storage locations designated by addresses="originating transit line numbers", with pointer addresses (next addresses) indicative of positions in the PIV table block 104c to be referred to successively. The respective PIV table blocks 104c are prepared for the respective originating transit lines and each table block 104c stores, at an address location designated by the terminating transit line number, a management data record concerning the VP established on the transit line (including an identifier VPIo of VP, a virtual channel identifier for control SVCIo, a value of assigned bandwidth and a value of used bandwidth). The hunted VPI is stored as the VPIo. It is to be noted that the SVCIo is determined in accordance with the SVC establishment procedure to be described later.

When operation of registration of data into the VP table is completed, a "packet requesting VP assignment" containing [VPI=0, VCI=i] in the header and {originating/terminating local node numbers and originating/terminating transit line numbers} in the user information area is generated and transmitted to a line interface 8b-n corresponding to the originating transit line number (step 84).

The "packet requesting VP assignment" is relayed by means of the transit node 2-n and transferred to the terminating local node 1-j (step 85).

The central controller 6-j of the terminating local node 1-j hunts an unused, empty VPI in the terminating transit line designated by the "packet requesting VP assignment" (hereinafter a VPI to be used between the transit node and the terminating local node will be called a "terminating VPI") and necessary information is registered in the VP table as designated by 104a to 104c. Then, a "packet notifying VP assignment" containing [VPI=0, VCI=i] in the header and {originating/terminating local node numbers, originating/terminating transit line numbers and terminating VPI} in the user information area is generated and transmitted through the self-routing switch 3-j to a line interface 8b'-n corresponding to the aforementioned terminating line interface number (step 86).

The "packet notifying VP assignment" is relayed by means of the transit node 2-n and transferred to the originating local node 1-i (step 87).

In response to the reception of the "packet notifying VP assignment", the central controller 6-i of the originating local node 1-i generates a "packet instructing VP connection" containing [VPI=0, VCI=i] in the header and {originating/terminating transit line numbers and originating/terminating VPI's} in the user information area, and transmits the packet to the line interface 8b-n through the self-routing switch 3-i (step 88).

When receiving the "packet instructing VP connection", the route management 7-n of the transit node 2-n stores "VPIo=terminating VPI" and "PT2=terminating transit line number" at a storage location of an address (VPIi)=originating VPI in the label conversion table 26c of the line interface 8c-i corresponding to the originating side transit line 10-i and "VPIo=originating VPI" and "PT2=originating side transit line number" at a storage location of an address (VPIi)=terminating VPI in the label conversion table 26c of the line interface 8c-j corresponding to the terminating side transit line. It is to be noted that in the transit node, a processor bus is set up between the route management 7-n and the respective line interfaces 8c-1 to 8c-k, like the processor bus set up between the central controller 6 and the respective line interfaces 8a-1 to 8b-k in each local node 1 and the contents of the label conversion table is updated through the processor bus. Each local node repeats the above procedure for the respective originating side transit lines so that a plurality of VP's may be established between this local node and each terminating local node, thereby defining the VP construction of FIG. 1.

SVC Establishment Procedure

The procedure for establishing, on the VP established through the above procedure, a VC for control signal (hereinafter referred to as an SVC) used during call setting operation will now be described with reference to FIGS. 9A and 9B. It is now assumed that a single SVC is established on each VP.

In association with the respective VP's assigned in steps 80 to 88, the central controller 6-i of the originating local node 2-i hunts an SVCI unique to an originating side transit line (hereinafter, an SVCI used for a channel destined from line interface 8b-n of the originating local node to line interface 8b'-n of the terminating local line is called an "originating SVCI") and registers the hunted SVCI in an SVCIo field of the VP table 104c shown in FIG. 16. Then, a "packet instructing SVC assignment connection" containing [VPI=originating VPI, VCI=1] in the header and {originating/terminating local node number, originating/terminating transit line number and originating SVCI} in the user information area is generated and transmitted to the line interface 8b-n through the self-routing switch 3-i (step 89).

The header of the packet instructing SVC assignment connection is converted into [VPI=terminating VPI] at line interface 8c-i of the transit node 2-n and then transferred to the terminating local node 1-j (step 90).

When receiving the "packet instructing SVC assignment connection", the central controller 6-j of the terminating local node 1-j hunts an SVCI unique to a terminating transit line (hereinafter an SVCI used for a channel destined from line interface 8b'-j of the terminating local node to line interface 8b-i of the originating local node is called a "terminating SVCI") and registers the hunted SVCI in the VP table 104c of FIG. 16 possessed by the terminating local node. Subsequently, the central controller 6-j stores, at a storage location of an address (SVCIi)="originating SVCI" in label conversion table 26b shown in FIG. 5 of the line interface 8b'-n corresponding to the terminating transit line 10-j, "VCIo=terminating SVCI" and "PT1=output port number destined for signal processor 52", generates a "packet instructing SVC connection" containing [VPI=terminating VPI, VCI=1] in the header and {originating/terminating local node numbers, originating/terminating transit line numbers and originating-/terminating SVCI's} in the user information area, and transmits the packet to the line interface 8b'-n through the self-routing switch 3-j (step 91).

The header of the "packet instructing SVC connection" is converted into [VPI=originating VPI] at the transit node 2-n and then transferred to the originating local node 1-i (step 92).

The central controller 6-i of the originating local node 1-i stores, at a storage location of an address (SVCIi)="terminating SVCI" in label conversion table 26b (FIG. 5) of the line interface 8b-n connected to the originating transit line, "VCIo=originating SVCI" and "PT1=output port number destined for signal processor 52".

Each local node executes the above procedure until SVC's corresponding to all VP's are established thereon.

Procedure for Bandwidth Assignment to VC

Figure 17:
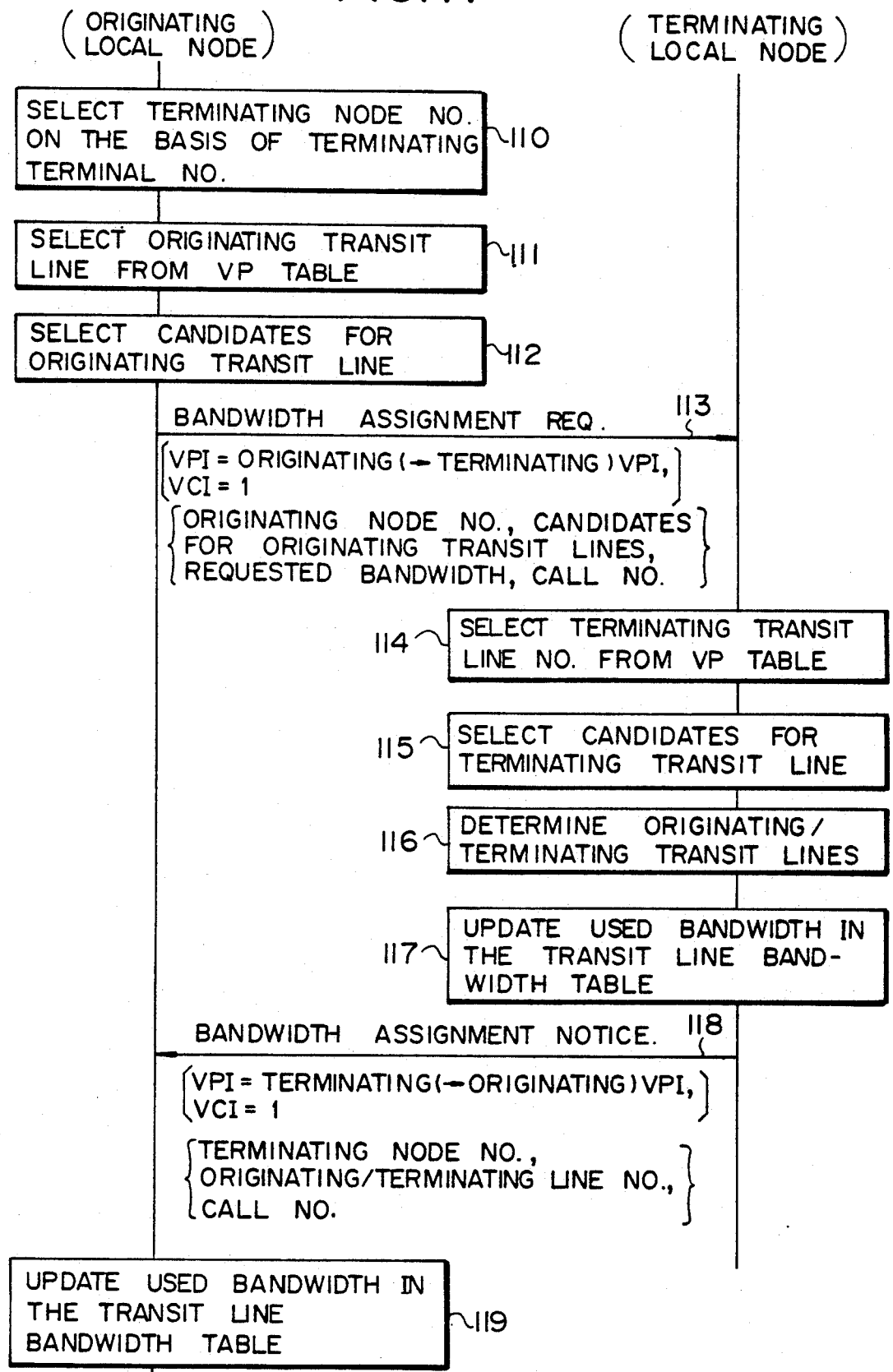
FIG. 17 is a diagram showing sequence of the bandwidth assignment procedure.

Referring now to FIG. 17, the procedure of assigning a bandwidth to the VC carried out during call setting will now be described.

When receiving a request for setting a call from an originating terminal connected to one of subscriber lines of a local node 1-i, the central controller 6-i of the originating local node 1-i selects a terminating local node number connected with the terminating terminal by looking up a dial number table (not shown) on the basis of a terminating terminal number (Telephone number) dialed by the originating terminal (step 110).

Subsequently, the central controller 6-i accesses the VP table 104a by using the terminating local node number as a retrieval key and selects some originating transit lines on which the VP destined for the terminating local node is established by looking up a table block 104b designated by the address pointer (step 111). To this end, the table block 104b is sequentially accessed to determine a storage address at which pointer data is recorded.

Figure 18:
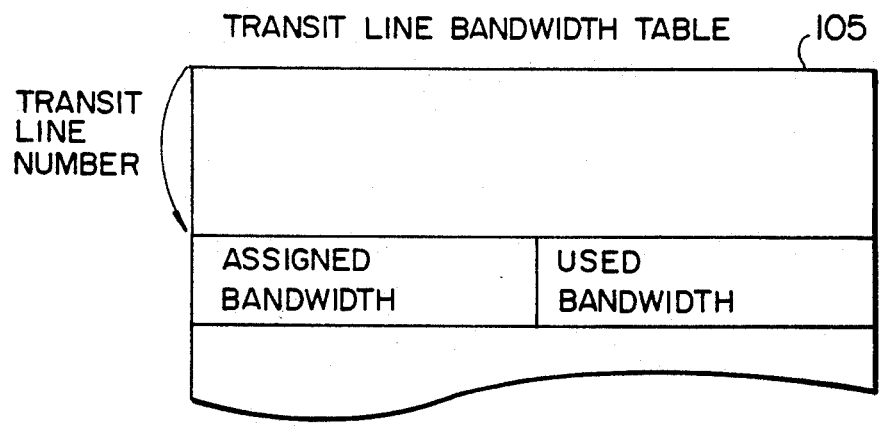
FIG. 18 is a diagram showing the construction of a transit line bandwidth table.

Subsequently, the central controller 6-i looks up a transit line bandwidth table 105 as shown in FIG. 18 for managing a used bandwidth in respect of each transit line to select a single or a plurality of candidates for originating transit lines to which a bandwidth requested by the originating terminal is assignable, from a plurality of originating transit lines having the VP destined for the terminating local node and determined from the table 104b (step 112).

The central controller 6-i generates a "packet requesting bandwidth assignment" containing [VPI=originating VPI (for bandwidth assignment), VCI=i] in the header and {originating local node number, candidates for originating transit lines, requested bandwidth and call number (VC identifier)} in the user information area, and transmits the packet to the terminating local node 1-j through the self-routing switch 3-i and any transit node 2-m (step 113).

The central controller 6-j of the terminating local node 1-j takes a similar procedure to that taken by the originating local node to select candidates for terminating transit lines which can satisfy the requested bandwidth indicated in the user information area of the "packet requesting bandwidth assignment", from the plurality of terminating transit lines having the VP destined for the originating local node (steps 114 and 115).

The central controller 6-j collates the candidates for terminating transit lines selected in the above step 115 with the candidates for originating transit lines notified by the "packet requesting bandwidth assignment" to determine a single transit line (VP) to which a transit node is connected in common (step 116). When a plurality of local nodes have the same construction and they are connected in an orderly manner to transit nodes as shown in FIG. 1, it is possible to decide, by a number possessed by a transit line, which transit node the transit line is connected to. In the circuit construction as above, the aforementioned collation can be realized easily by, for example, expressing the candidates for originating transit lines and the candidates for terminating transit lines in such a map form-that transit lines connected to the same transit node line at the same bit position.

Subsequently, the central controller 6-j adds the presently assigned bandwidth to the used bandwidth field of record, of the transit line bandwidth table 105 as shown in FIG. 18, corresponding to the aforementioned determined transit line (step 117). Thereafter, a "packet notifying bandwidth assignment" containing [VPI=terminating VPI (for bandwidth assignment), VCI=1] in the header and {terminating local node number, originating/terminating transit line number and call number} in the user information area is generated and transitted to the originating local node 1-i (step 118).

In response to the reception of the "packet notifying bandwidth assignment", the central controller 6-i of the originating local node 1-i adds the presently assigned bandwidth to the used bandwidth field of record corresponding to the transit line determined in the originating local node (step 119).

2.2 Application Mode Procedure 1 (instance where bandwidth is assigned to only specified VP in advance)

Referring now to FIGS. 9A and 9B, the procedure for assigning a bandwidth to one or a plurality of specified VP's will now be described. For designation of bandwidth, particular two local nodes are specified by, for example, the operator and a bandwidth to be secured for a VP between the two specified local nodes is designated.

VP Establishment Procedure

Operations carried out in steps 80 to 83 are similar to those carried out in the basic mode procedure described previously.

In step 84, the same operation as that of the basic mode procedure is carried out, excepting that if the VP is to be assigned with the bandwidth, the assigned bandwidth is added to the used bandwidth field of the transit line bandwidth table 105 in the originating local node 1-i and registered in the VP table 104c, and {assigned bandwidth} is added to the user information area of the "packet requesting VP assignment".

In step 85, the same operation as that in the basic mode procedure is carried out and the operation carried out in step 86 is the same as that in the basic mode procedure with the exception that the assigned bandwidth is added to the used bandwidth field in the transit line bandwidth table 105 of the terminating local unit 1-j and that the assigned bandwidth is registered in the VP table 104c. In steps 87 and 88, the same operation as that in the basic mode procedure is carried out.

SVC Establishment Procedure

The SVC establishment procedure is the same as that in the basic mode procedure.

Procedure for Bandwidth Assignment to VC

Figure 19:
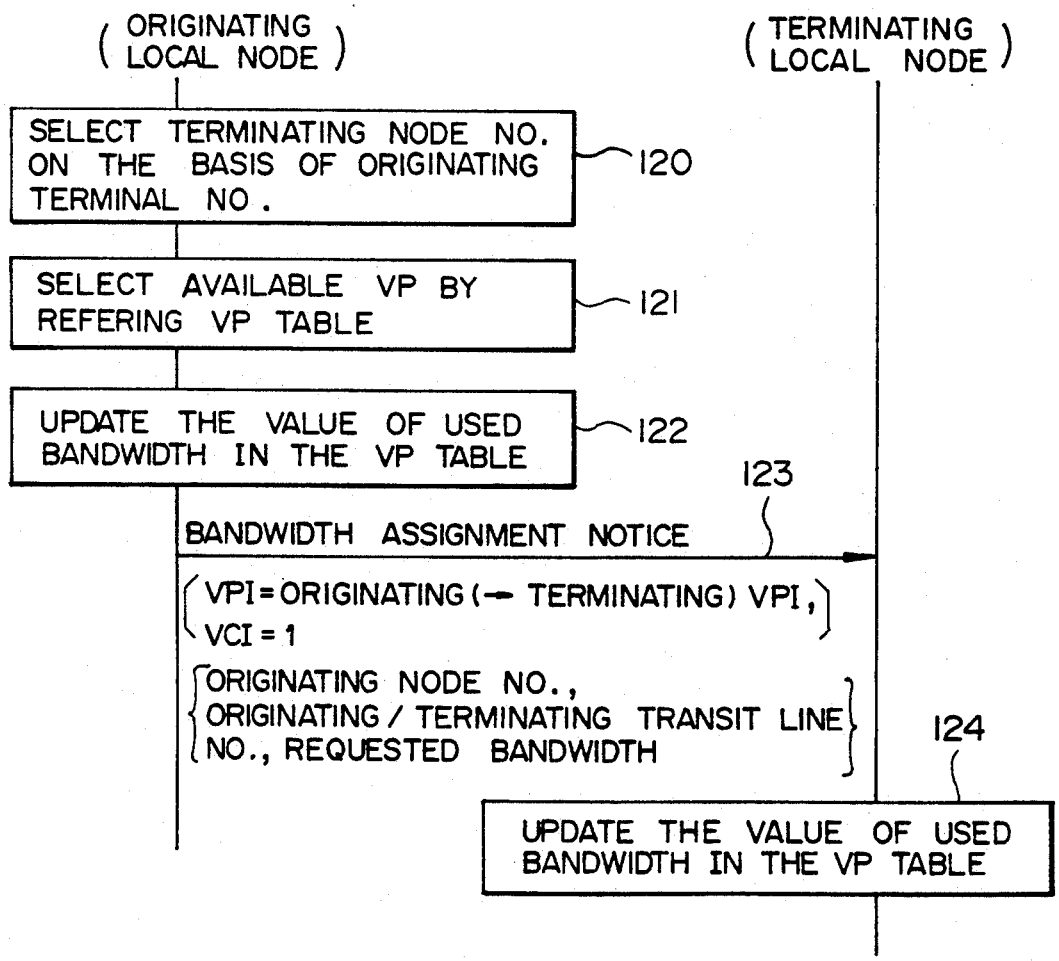
FIG. 19 is a sequence diagram showing another embodiment of the bandwidth assignment procedure.

In case where a VC is established on a VP other than the VP to which the bandwidth is assigned in advance, the procedure is the same as that in the basic mode procedure described previously. The procedure of establishing a CV during call setting request on a VP to which a bandwidth is assigned in advance will now be described with reference to FIG. 19.

The central controller 6-i of the originating local node 2-i determines a node number possessed by the terminating local node 2-j to which the terminating terminal is connected, from the dial number table on the basis of a terminating terminal number dialled by an originating terminal (step 120).

Subsequently, the central controller 6-i selects a VP to which a bandwidth requested by the originating terminal is assignable from the VP table 104c (step 121) and adds the presently assigned bandwidth to the used bandwidth field in the VP table 104c (step 122). The central controller 6-i generates a "packet notifying bandwidth assignment" containing [VPI=originating VPI (for bandwidth assignment), VCI=1] in the header and {originating local node number, originating/terminating transit line numbers and requested bandwidth} in the user information area, and transmits the packet to the terminating local node 1-j (step 123).

When receiving the packet notifying bandwidth assignment, the terminating local node 1-j adds the assigned bandwidth designated by the "packet notifying bandwidth assignment" to the used bandwidth field in the VP table 104c (step 124).

2.3 Application Mode Procedure 2 (instance where high priority class is provided for VP)

VP Establishment Procedure

The VP establishment procedure in which the VP is weighted by high priority class or low priority class will now be described.

In the present embodiment, it is assumed that the packet for control signal is of high priority class, the packet for user signal is of low priority class and a single VP for control signal (hereinafter referred to as an SVP) is established for each VP for user signal. In the foregoing embodiments, the SVC exists in the VP for user signal but in the present embodiment, the SVC exists in the SVP.

Figure 20:
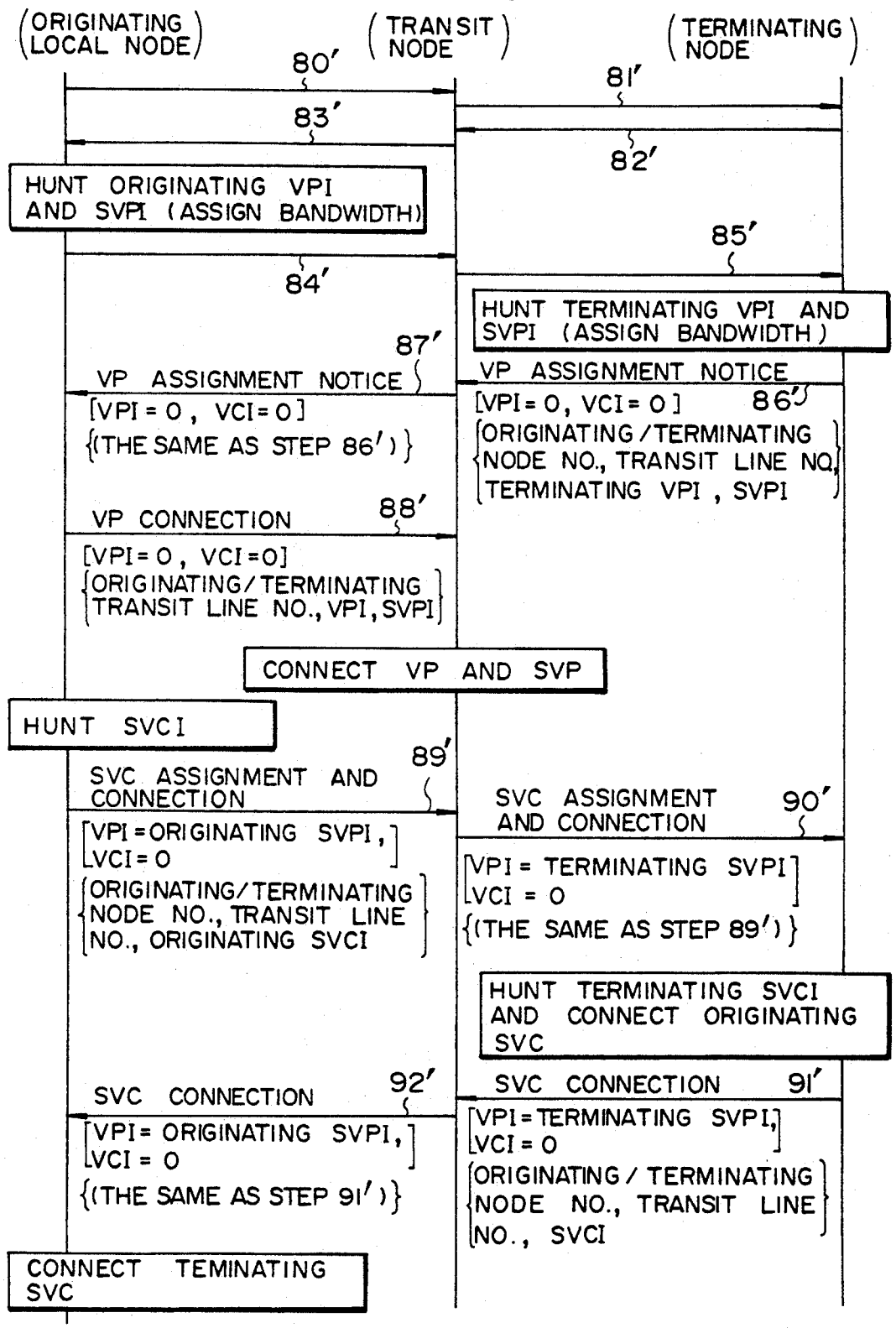
FIG. 20 is a sequence diagram showing another embodiment of the VP establishment procedure.
Figure 21:
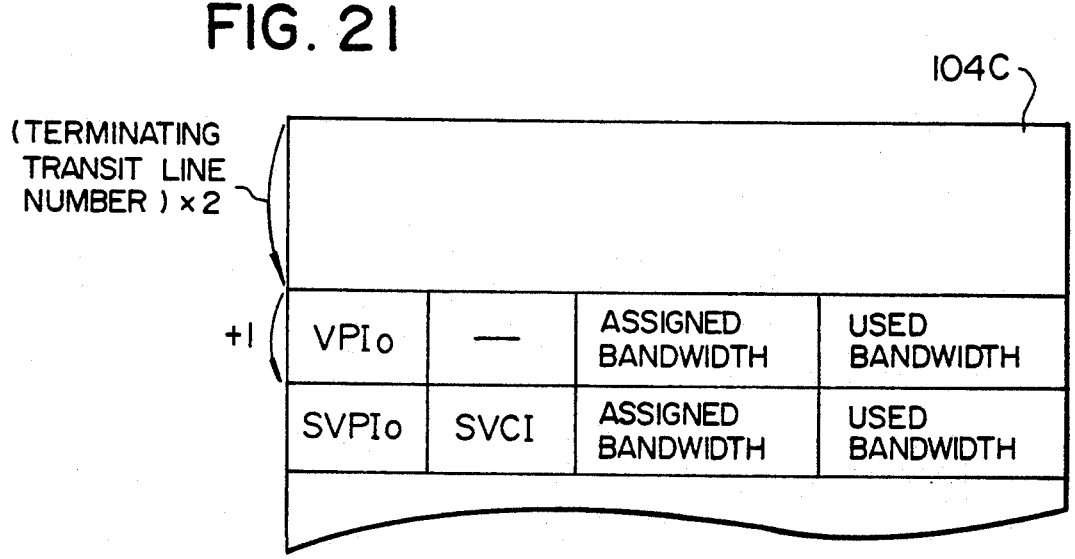
FIG. 21 is a diagram showing the construction of another embodiment of the VP table.

FIG. 20 is a diagram showing the VP establishment procedure taking high/low priority class into consideration. Process steps 80' to 92' in FIG. 20 correspond to steps 80 to 92 shown in FIGS. 9A and 9B. Steps 80' to 83' covering the process in which the originating local node 1-i transmits the "packet requesting a map of transit lines" and receives the "packet notifying a map of transit lines" from the terminating local node 1-j have the same contents as steps 80 to 83 in FIG. 9A.

When receiving the "packet notifying a map of transit lines", the originating local node 1-j hunts an originating VPI and an originating SVPI. To clarify the correspondence relation between the VPI and SVPI, an address at which a VPI record is registered in the VP table 104c is set to be "terminating transit line number" × 2 and an address at which an SVPI record is registered in the VP table 104c is set to be ("terminating transit line number" × 2)+1.

Steps 84' and 85' covering the process in which the originating local node 1-i transmits the "packet requesting VP assignment" and the transit node relays the packet to the terminating local node 1-j resemble steps 84 and 85 in FIG. 9A.

When receiving the packet requesting VP assignment, the central controller 6-j of the terminating local node 1-j hunts the terminating VPI and terminating SVPI, registers them in the VP table 104c and thereafter transmits to the originating local node 1-i a "packet notifying VP assignment" containing [VPI=0, VCI=1] in the header and {originating/terminating local node numbers, originating/terminating transit line numbers, terminating VPI and terminating SVPI} in the user information area (step 86').

The "packet notifying VP assignment" is relayed by means of the transit node so as to be transferred to the originating local node 1-i (step 87').

Figure 22:
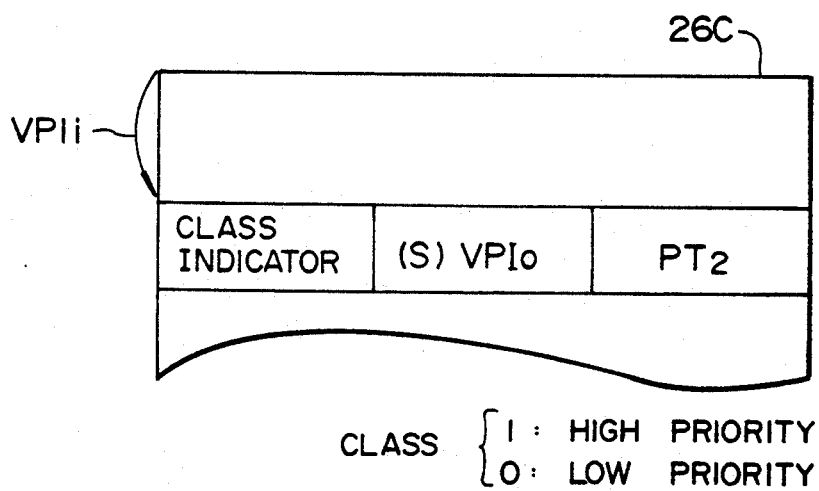
FIG. 22 is a diagram showing the construction of another embodiment of the label conversion table.

When receiving the "packet notifying VP assignment", the central controller 6-i of the originating local node 1-i generates a "packet instructing VP connection" containing [VPI=0, VCI=1] in the header and {originating/terminating transit line numbers, originating/terminating VPI's and originating/terminating SVPI's} in the user information area and transmits the packet to the terminating local node through the transit node (step 88'). When the route management processor recognizes that the received packet is the "packet instructing VP connection", it stores, at a storage location of an address (VPIi)=originating VPI in the label conversion table 26c as shown in FIG. 22 which is provided in the line interface corresponding to the originating transit line, "class indication=O", "VPIo=terminating VPI" and "PT2=terminating transit line number" and at a storage location of an address (VPIi)=originating SVPI, "class indication=1", "VPIo=terminating SVPI" and "PT2=terminating transit line number". Further, the route management processor stores, at a storage position of an address (VPIi)=terminating VPI in the label conversion table 26c provided in the line interface corresponding to the terminating transit line, "class indication=O", "VPIo=originating VPI" and "PT2=originating transit line number" and at a storage location of an address (VPIi)=terminating SVPI, "class indication=1", "VPIo=originating SVPI" and "PT2=originating transit line number".

SVC Establishment Procedure

Steps 89' to 92' covering the process in which the originating local node 1-i transmits the "packet instructing SVC assignment connection" and receives the "packet instructing SVC connection" from the terminating local node 1-j are the same as steps 89 to 92 in FIGS. 9A and 9B, excepting that the SVC is established on the SVP.

Procedure for Bandwidth Assiqnment to VC

The procedure of assigning a bandwidth toga VC is the same as that in the basic mode procedure (or application mode procedure 1).

Figure 24:
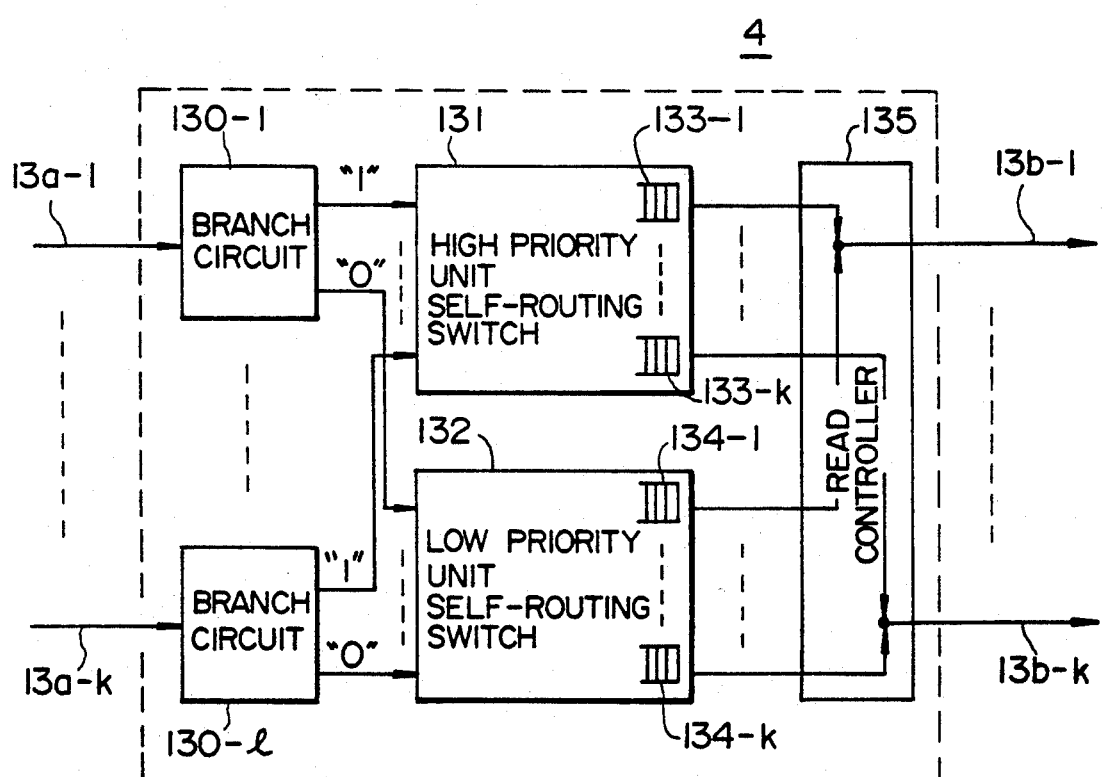
FIG. 24 is a block diagram showing an embodiment of a self-routing switch in the transit node.

Referring now to FIG. 24, VP priority control in the self-routing switch 4 constituting the transit node will be described.

Figure 23:
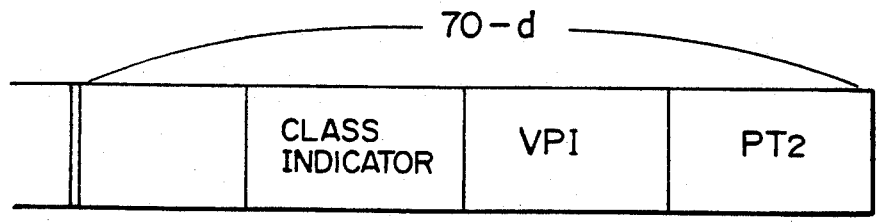
FIG. 23 is a diagram showing a packet format having an identifier of priority class.

A packet (FIG. 23) subjected to the label conversion process by means of the line interface 8c-i is fetched into a branch circuit 130-i through an input line 13a-i. In accordance with a class indication (1:high priority, 0:low priority) in the VPI area, the branch circuit 130-i distributes the packet to a high-priority unit self-routing switch 131 or a low-priority unit self-routing switch 132. The high-priority unit self-routing switch 131 switches the packet to a high priority class queue 133 (FIFO) corresponding to PT2, and the low-priority unit self-routing switch 132 switches the packet to a low priority class queue 134 (FIFO) corresponding to PT2. A read controller 135 reads packets from high priority class queues 133-1–133-k in preference to the packet of low priority class queues 134-1–134-k (for example, at a ratio of 1:2).

As is clear from the foregoing description, since according to the present invention the packet processing control including the bandwidth management for packet circuit and routing control is not carried out by the transit node but is effected by each local node, danger of occurrence of faults in the network or packet switching system comprised of the nodes can be managed to be distributed to thereby improve reliability of the system.

Further, in each local node, only the virtual (logical) path identifier is defined without precedently specifying the path capacity and when a logical connection (virtual channel VC) is established on any virtual path in accordance with a call setting request, management of a margin bandwidth is effected for each physical line on which the virtual path exists so that the logical connection may be established if a margin bandwidth is present, thereby ensuring that as compared to the conventional network in which all Virtual paths are assigned with bandwidths in advance, the network cost can be reduced for the same performance (call block rate) and the call block rate can be reduced for the same network construction.

Furthermore, according to the present invention, the status of used-bandwidth on any line for connection and relay between the local and transit nodes is managed by a local node to which the line is connected so that a plurality of originating/terminating transit lines may be checked for their status of used bandwidth by a control signal communicated during call setting between an originating local node and a terminating local node so as to select an optimum route from the plurality of transit lines, thereby ensuring that as compared to the system in which the line is selected by means of only the originating local node, the call block rate can be reduced.

We claim:

1. A packet switching method for use in a packet network having a plurality of local switching units each connected to a plurality of packet lines, and at least one cross-connect unit connected to each local switching unit through at least one transit line having a predetermined transmission capacity, comprising the steps of:
  defining, on each transit line, a plurality of virtual paths for interconnecting at least a pair of said plurality of local switching units through said cross-connect unit, without fixedly assigning communication bandwidth to individual virtual paths;
  storing, for each transit line, the total value of communication bandwidths assigned to virtual channels which have already been established in the virtual paths present on the transit line;
  checking, when a request for setting a new call is originated, communication bandwidths of first and second transit line, on which exists a virtual path to form thereon a virtual channel for said call, to determine whether the transmission capacity of each of said first and second transit lines can afford to accept assignment of a bandwidth requested by the call, said first transit line lying between said cross-connect unit and an originating local switching unit and said second transit line lying between said cross-connect unit and a terminating local switching unit; and
  establishing, if each of said first and second transit lines has a communication bandwidth portion not yet assigned that is wide enough to accept the assignment of the bandwidth requested by said call, said virtual channel for said call on said virtual path and updating total values of said communication bandwidths assigned to said first and second transit lines, respectively.

2. A packet switching method according to claim 1 wherein said packet network has a plurality of cross-connect units each connected to the individual local switching units through at least one transit line having a predetermined transmission capacity, and wherein in said defining step, a plurality of virtual paths are defined between each local switching unit and different desired local switching unit through different cross-connect units; in said storing step, an originating local switching unit connected to a packet line originating a new call selects a plurality of first transit lines each having a communication bandwidth portion not yet assigned that is wide enough to accept assignment of a bandwidth requested by said call as candidates for originating transit lines on which a virtual channel for said call is to be established, and a terminating local switching unit is notified of the selected candidates for transit lines; and
  said terminating local switching unit selects a plurality of second transit lines each having a communication bandwidth portion ont yet assigned that is wide enough to accept assignment of the bandwidth requested by said call as candidates for terminating transit lines on which the virtual channel for said call is to be established, and collates the candidates for originating transit lines with the candidates for terminating transit lines to specify a virtual path on which said virtual channel for said call is to be established.

3. A packet switching method according to claim 1 wherein in said defining step, part of said virtual paths are fixedly assigned with predetermined communication bandwidths in advance, and the remaining virtual paths not subjected to the fixed assignment of communication bandwidths are applied with execution of said checking and establishing steps in connection with virtual channels.

4. A packet switching method according to claim 1 wherein in said defining step, the virtual paths are classified into virtual paths having high priority class and virtual paths having low priority class, and each local switching unit and each cross-connect unit carry out switching processing of packets communicated through said virtual paths of high priority class in preference to that of packets communicated through said virtual paths of low priority class.

5. A packet switching method for use in a packet switching system having a plurality of local switching units each connected to a plurality of packet lines, and a plurality of tandem units each connected to the individual local switching units through at least one transit line having a predetermined transmission capacity, comprising the steps of:
  defining, on each transit line, a plurality of virtual paths each for interconnecting a pair of the plurality of local switching units through one of said tandem units;

storing, for each transit line, the total value of communication bandwidths assigned to virtual channels which have already been established in virtual paths defined on the transit line;

checking when a request for setting a new call is received by any particular local switching unit, communication bandwidths of first and second transit lines, on which exists a virtual path to form thereon a virtual channel for said call, to determine whether each transmission capacity of said first and second transit lines has a communication bandwidth portion not yet assigned and whether said portion not yet assigned is wide enough to accept assignment of a bandwidth requested by the call, said first transit line lying between one of said tandem units and said particular local switching unit, and said second transit line lying between said one of said tandem unit and a terminating local switching unit; and establishing, if said first and second transit lines have a communication bandwidth portion not yet assigned that is wide enough to accept the assignment of the bandwidth requested by said call, said virtual channel for said call on said virtual path and updating the total values of communication bandwidths assigned to said first and second transit lines, respectively.

6. A packet network comprising:

a plurality of local switching units each connected to a plurality of packet lines; and a plurality of transit units each connected to the individual local switching units through at least one transit line having a predetermined transmission capacity;

each of said local switching units comprises:

a plurality of first label conversion means each connected to one of said plurality of packet lines and being responsive to a logical channel identifier contained in an incoming packet received from the packet line to add first switching information to said incoming packet, a plurality of second label conversion means each connected to one of said transit lines and being responsive to a logical channel identifier contained in an outgoing packet received from the transit line to add second switching information to said outgoing packet, a self-routing switch connected to said first and second label conversion mean and operative to switch the incoming packet received from each of said first label conversion means to one of said transit lines selected on the basis of the first switching information contained in the incoming packet and to switch the outgoing packet received from each of said second label conversion means to one of said packet lines selected on the basis of the second switching information contained in the outgoing packet, and control means connected to said self-routing switch and operative to terminate a control packet and perform call processing control;

each of said transit units comprises:

a plurality of third label conversion means each connected to one of said transit lines and being responsive to a logical path identifier contained in an incoming packet received from the transit line to add third switching information to said incoming packet, and a self-routing switch connected to said plurality of third label conversion means and operative to switch the incoming packet received from each of said third label conversion means to one of said transit lines as an outgoing packet on the basis of said third switching incoming packet;

said control means of each local switching unit comprises:

means for establishing a plurality of logical paths having bandwidths unfixed in advance between the local switching unit and a desired different local switching unit through different transit units, means for managing an available bandwidth for each transit line on which at least one logical path is established, and means for checking, when a request for setting a call is originated from any subscriber line connected to the local switching unit, the available bandwidth of a transit line on which a logical path exists on which said call is to be established to determine whether the available bandwidth has a portion not yet assigned and whether the portion not yet assigned is wide enough to accept the assignment of the bandwidth requested by said call and establishing, if said transit lines have the available bandwidth portion not yet assigned that is wide enough, a logical channel for said call on said logical path.

7. A packet network to claim 6, wherein said control means of each local switching unit further comprises:

first storage means for storing identification information of transit lines connecting the local switching unit and any one of transit units;

second storage means for storing information indicative of the connection relation between all transit lines in said packet network and the local switching unit associated with the control means;

means for requesting a particular one of the other local switching units, for which a logical path is to be established, to send transit line identification information owned by said particular switching unit;

means for defining, when the transit line identification information is supplied from said particular switching unit, a plurality of logical paths between the local switching unit and said particular local switching unit through different transit units on the basis of the supplied transit line identification information and the information stored in said first and second storage means of the switching unit; and third storage means for storing information as to logical paths which are being established or have been established by the local switching unit.

8. A packet network according to claim 7 wherein said control means of each local switching unit further comprises:

means for selecting, when a call is requested, one of said transit lines and establishing thereon a logical channel for said call depending on the status of used bandwidth of transit lines connected to the local switching unit and the status of used bandwidths of transit lines connected to a particular local switching unit for which said call is destined.

9. A packet network according to claim 6 wherein said logical path establishment means fixedly assigns predetermined communication bandwidths to part of said logical paths.

10. A packet network according to claim 6 wherein said logical path establishment means classifies said logical paths into at least one logical path having high priority class and at least one logical path having low priority class, and each local switching unit and each transit unit have means for carrying out switching processing of packets communicated through said logical path of high priority class in preference to that of packets communicated through said logical path of low priority class.

11. A packet network comprising:
a plurality of local switching nodes each connected to a plurality of packet lines; and
a plurality of transit nodes respectively connected to the local switching nodes through at least one transit line having a predetermined transmission capacity;
each of said local switching nodes comprises:
first means for generating, when a call is originated from any packet line connected to the local switching node, a first control packet containing information indicative of the status of used bandwidth of the transit lines between the local switching node and individual transit nodes and transferring said first control packet to a terminating one of the other local switching nodes for which said call is destined,
second means for determining, when another first control packet designating the local switching unit as a terminating one and generated by an originating one of the other local switching nodes is received, a pair of first and second transit lines on the basis of the status of used bandwidth of transit lines between the local switching node and the individual transit nodes and information contained in said received first control packet indicative of the status of used bandwidth of transit lines connected to said originating one of the other local switching nodes, said first transit line connecting said originating one of the other local switching node and a particular transit node, said second transit line connecting the local switching node and said particular transit node, and transferring a second control packet containing identification information of said pair of first and second transit lines to said originating one of the other local switching nodes,, and
third means for establishing, when the local switching node determines said pair of first and second transit lines or another second control packet is received from one of the other local switching nodes serving as the terminating one, a logical channel for said call in a logical path on said pair of first and second transit lines and updating information indicative of the used bandwidth of said first or second transit line having a connection with the switching node.

12. A packet switching method for use in a packet network having a plurality of local switching units each connected to a plurality of packet lines, and at least one cross-connect unit connected to each local switching unit through at least one transit line having a predetermined transmission capacity, comprising the steps of:
defining, on each transit line, at least one virtual path for interconnecting at least a pair of said plurality of local switching units through said cross-connect unit, without fixedly assigning communication bandwidth to the virtual path;
storing, for each transit line, the total value of communication bandwidths assigned to virtual channels which have already been established in the virtual path present on the transit line;
checking, when a request for setting a new call is originated, communication bandwidths of first and second transit lines, on which exists a virtual path to form thereon a virtual channel for said call, to determine whether the transmission capacity of each of said first and second transit lines can afford to accept assignment of a bandwidth requested by the call, said first transit line lying between said cross-connect unit and an originating local switching unit and said second transit line lying between said cross-connect unit and a terminating local switching unit; and
establishing, if both of said first and second transit lines have an available communication bandwidth portion wide enough to accept the assignment of the bandwidth requested by said call, said virtual channel for said call on said virtual path and updating total values of said communication bandwidths assigned to said first and second transit lines, respectively.

13. A packet switching method for use in a packet switching system having a plurality of local switching units each connected to a plurality of packet lines, and a plurality of of tandem units each connected to the individual local switching units through at least one transit line having a predetermined transmission capacity, comprising the steps of:
defining, on each transit line, at least one virtual path for interconnecting at least a pair of the plurality of local switching units through one of said tandem units;
storing, for each transit line, the total value of communication bandwidths assigned to virtual channels which have already been established in the virtual path defined on the transit line;
checking, when a request for setting a new call is received by any particular local switching unit, communication bandwidths of first and second transit lines, on which exists a virtual path to form thereon a virtual channel for said call, to determine whether both of said first and second transit lines have an available communication bandwidth portion wide enough to accept assignment of a bandwidth requested by the call, said first transit line lying between one of said tandem units and said particular local switching unit, and said second transit line lying between said one of said tandem unit and a terminating local switching unit; and
establishing, if said first and second transit lines have an available communication bandwidth portion not yet assigned that is wide enough to accept the assignment of the bandwidth requested by said call, said virtual channel for said call on said virtual path and updating the total values of communication bandwidths assigned to said first and second transit lines, respectively.

* * * * *